(12) United States Patent
Fujiwara et al.

(10) Patent No.: US 8,874,037 B2
(45) Date of Patent: Oct. 28, 2014

(54) COMMUNICATION SYSTEM, COMPUTER-READABLE STORAGE MEDIUM HAVING STORED THEREON INFORMATION PROCESSING PROGRAM, INFORMATION PROCESSING METHOD, INFORMATION PROCESSING APPARATUS, AND INFORMATION PROCESSING SYSTEM

(75) Inventors: Shinya Fujiwara, Kyoto (JP); Kouichi Kawamoto, Kyoto (JP); Yuichiro Ito, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 802 days.

(21) Appl. No.: 13/111,033

(22) Filed: May 19, 2011

(65) Prior Publication Data

US 2012/0164945 A1 Jun. 28, 2012

(30) Foreign Application Priority Data

Dec. 28, 2010 (JP) ................ 2010-293960

(51) Int. Cl.
| | |
|---|---|
| *H04B 7/00* | (2006.01) |
| *G06Q 50/00* | (2012.01) |
| *H04L 12/18* | (2006.01) |
| *A63F 13/30* | (2014.01) |
| *H04W 84/10* | (2009.01) |
| *H04W 4/00* | (2009.01) |
| *H04W 8/00* | (2009.01) |
| *H04W 76/02* | (2009.01) |

(52) U.S. Cl.
CPC .......... *H04L 12/1822* (2013.01); *H04W 84/10* (2013.01); *H04W 4/008* (2013.01); *G06Q 50/01* (2013.01); *H04W 8/005* (2013.01); *A63F 2300/572* (2013.01); *H04W 76/02* (2013.01); *A63F 13/12* (2013.01)
USPC ........................................ 455/41.2; 455/514

(58) Field of Classification Search
CPC ....... H04B 5/02; H04B 1/3827; H04W 4/008; H04W 8/005; H04W 8/18; H04W 76/02; A63F 13/12; A63F 2300/572
USPC ............ 455/414.1, 41.2, 41.3, 514, 69, 556.1
See application file for complete search history.

(56) References Cited

U.S. PATENT DOCUMENTS

| | | | |
|---|---|---|---|
| 5,396,225 | A | 3/1995 | Okada et al. |
| 5,618,045 | A | 4/1997 | Kagan et al. |

(Continued)

FOREIGN PATENT DOCUMENTS

| | | |
|---|---|---|
| EP | 0 710 017 | 5/1996 |
| EP | 1 493 474 | 1/2005 |

(Continued)

OTHER PUBLICATIONS

English-language machine translation of JP 2010-022704.

(Continued)

*Primary Examiner* — Andrews Wendell
(74) *Attorney, Agent, or Firm* — Nixon & Vanderhye, P.C.

(57) ABSTRACT

Another information processing apparatus in a communicable range of a short-distance wireless communication is repeatedly searched for, and wireless communication is automatically established therewith, first data is automatically transmitted to the other information processing apparatus with which the wireless communication has been established, and first data transmitted from the other information processing apparatus is automatically received by means of the short-distance wireless communication. Further, transmission of second data is permitted which is different from first data to the other information processing apparatus with which the transmission/reception of the first data has been performed before.

18 Claims, 27 Drawing Sheets

(56) References Cited

U.S. PATENT DOCUMENTS

| | | |
|---|---|---|
| 5,666,293 A | 9/1997 | Metz et al. |
| 5,732,275 A | 3/1998 | Kullick et al. |
| 6,018,720 A | 1/2000 | Fujimoto |
| 6,438,573 B1 | 8/2002 | Nilsen |
| 6,733,382 B2 | 5/2004 | Oe et al. |
| 6,736,727 B1 | 5/2004 | Doi et al. |
| 7,054,831 B2 | 5/2006 | Koenig |
| 7,114,090 B2 | 9/2006 | Kardach et al. |
| 7,290,072 B2 | 10/2007 | Quraishi et al. |
| 7,346,708 B2 | 3/2008 | Minamisawa |
| 7,457,410 B2 | 11/2008 | Yamauchi et al. |
| 7,493,613 B2 | 2/2009 | D'Souza et al. |
| 7,565,653 B2 | 7/2009 | Inoue et al. |
| 7,620,027 B2 | 11/2009 | Igarashi et al. |
| 7,704,147 B2 | 4/2010 | Quraishi et al. |
| 7,725,078 B2 | 5/2010 | Kuwahara et al. |
| 7,729,661 B2 | 6/2010 | Tanaka et al. |
| 7,794,328 B2 | 9/2010 | Horigome |
| 7,801,818 B2 | 9/2010 | Tsukazaki et al. |
| 7,811,171 B2 | 10/2010 | Mitsuyoshi et al. |
| 7,813,300 B2 | 10/2010 | Takayama et al. |
| 7,819,750 B2 | 10/2010 | Lam et al. |
| 7,854,657 B2 | 12/2010 | Shiraiwa |
| 7,862,433 B2 | 1/2011 | Sato et al. |
| 7,901,293 B2 | 3/2011 | Oe |
| 7,929,911 B2 | 4/2011 | Tanaka et al. |
| 7,934,995 B2 | 5/2011 | Suzuki |
| 8,052,528 B2 | 11/2011 | Shiraiwa et al. |
| 8,075,405 B2 | 12/2011 | Sasaki et al. |
| 8,078,160 B2 | 12/2011 | Quinn |
| 8,116,679 B2 * | 2/2012 | Dunko ................... 455/41.1 |
| 8,185,165 B2 | 5/2012 | Beninghaus et al. |
| 8,229,962 B1 | 7/2012 | Cavalancia, II |
| 8,261,258 B1 | 9/2012 | Jianu et al. |
| 8,433,375 B2 | 4/2013 | Yamazaki et al. |
| 8,505,008 B2 | 8/2013 | Yamazaki et al. |
| 8,700,478 B2 | 4/2014 | Kubo et al. |
| 2001/0003714 A1 | 6/2001 | Takata et al. |
| 2001/0048744 A1 | 12/2001 | Kimura et al. |
| 2002/0016166 A1 | 2/2002 | Uchida et al. |
| 2002/0065137 A1 | 5/2002 | Tonomura |
| 2002/0083160 A1 | 6/2002 | Middleton |
| 2003/0033413 A1 | 2/2003 | Wilson, Jr. et al. |
| 2003/0038731 A1 | 2/2003 | Sako et al. |
| 2003/0126218 A1 | 7/2003 | Sakonsaku |
| 2003/0134623 A1 | 7/2003 | Kanamura et al. |
| 2003/0207700 A1 | 11/2003 | Yamanaka |
| 2004/0002774 A1 | 1/2004 | Conti et al. |
| 2004/0082383 A1 | 4/2004 | Muncaster et al. |
| 2004/0122931 A1 | 6/2004 | Rowland et al. |
| 2004/0127288 A1 | 7/2004 | Furuhashi et al. |
| 2004/0151126 A1 | 8/2004 | Matsubara |
| 2004/0215735 A1 * | 10/2004 | Nakahara et al. ............ 709/207 |
| 2004/0224769 A1 | 11/2004 | Hansen et al. |
| 2004/0259642 A1 | 12/2004 | Tanaka et al. |
| 2005/0047356 A1 | 3/2005 | Fuji et al. |
| 2005/0068928 A1 | 3/2005 | Smith et al. |
| 2005/0070327 A1 | 3/2005 | Watanabe |
| 2005/0073764 A1 | 4/2005 | Ogawa et al. |
| 2005/0154759 A1 | 7/2005 | Hofmeister et al. |
| 2005/0282639 A1 | 12/2005 | Tanaka et al. |
| 2006/0068702 A1 | 3/2006 | Miwa et al. |
| 2006/0106963 A1 | 5/2006 | Sasaki et al. |
| 2006/0166739 A1 | 7/2006 | Lin |
| 2006/0168574 A1 | 7/2006 | Giannini et al. |
| 2006/0234631 A1 | 10/2006 | Dieguez |
| 2006/0247059 A1 | 11/2006 | Nogami et al. |
| 2006/0282518 A1 | 12/2006 | Karaoguz et al. |
| 2006/0282834 A1 | 12/2006 | Cheng et al. |
| 2007/0078004 A1 | 4/2007 | Suzuki et al. |
| 2007/0105623 A1 | 5/2007 | Tanaka et al. |
| 2007/0118587 A1 | 5/2007 | Ishikawa et al. |
| 2007/0121534 A1 | 5/2007 | James et al. |
| 2007/0123168 A1 | 5/2007 | Takehara et al. |
| 2007/0136817 A1 | 6/2007 | Nguyen |
| 2007/0149183 A1 | 6/2007 | Dunko et al. |
| 2007/0174471 A1 | 7/2007 | Van Rossum |
| 2007/0195724 A1 * | 8/2007 | Yang et al. .................... 370/321 |
| 2007/0203969 A1 | 8/2007 | Wakasa et al. |
| 2007/0204279 A1 | 8/2007 | Warshavsky et al. |
| 2007/0213795 A1 | 9/2007 | Bradley et al. |
| 2007/0213975 A1 | 9/2007 | Shimoda et al. |
| 2007/0232310 A1 | 10/2007 | Schiff et al. |
| 2007/0249365 A1 * | 10/2007 | Jendbro ................... 455/456.1 |
| 2007/0271234 A1 * | 11/2007 | Ravikiran ........................ 707/3 |
| 2008/0076455 A1 * | 3/2008 | Kim et al. .................... 455/466 |
| 2008/0119281 A1 | 5/2008 | Hirose et al. |
| 2008/0123582 A1 | 5/2008 | Maekawa |
| 2008/0139310 A1 | 6/2008 | Kando et al. |
| 2008/0148350 A1 * | 6/2008 | Hawkins et al. .................. 726/2 |
| 2008/0188301 A1 | 8/2008 | Kawamoto et al. |
| 2008/0209071 A1 | 8/2008 | Kubota |
| 2008/0261658 A1 * | 10/2008 | Jin et al. .................... 455/562.1 |
| 2009/0011709 A1 | 1/2009 | Akasaka et al. |
| 2009/0028094 A1 | 1/2009 | Okada et al. |
| 2009/0037526 A1 | 2/2009 | Elliott et al. |
| 2009/0058639 A1 | 3/2009 | Tanaka et al. |
| 2009/0061870 A1 | 3/2009 | Finkelstein et al. |
| 2009/0064299 A1 * | 3/2009 | Begorre et al. ................... 726/7 |
| 2009/0093310 A1 | 4/2009 | Tanaka et al. |
| 2009/0124393 A1 | 5/2009 | Tanaka et al. |
| 2009/0137321 A1 | 5/2009 | Katsume et al. |
| 2009/0143114 A1 | 6/2009 | Vargas et al. |
| 2009/0143140 A1 | 6/2009 | Kitahara |
| 2009/0158430 A1 | 6/2009 | Borders |
| 2009/0186603 A1 | 7/2009 | Usami et al. |
| 2009/0193365 A1 | 7/2009 | Sugiura |
| 2009/0217307 A1 | 8/2009 | Ooe |
| 2009/0253518 A1 | 10/2009 | Sasaki et al. |
| 2009/0307105 A1 | 12/2009 | Lemay et al. |
| 2009/0310594 A1 | 12/2009 | Nakata et al. |
| 2010/0083181 A1 | 4/2010 | Matsushima et al. |
| 2010/0111057 A1 | 5/2010 | Nakamura et al. |
| 2010/0130254 A1 | 5/2010 | Kamada et al. |
| 2010/0167697 A1 | 7/2010 | Ishikawa et al. |
| 2010/0185977 A1 | 7/2010 | Ito |
| 2010/0312817 A1 | 12/2010 | Steakley |
| 2010/0325235 A1 | 12/2010 | Konno et al. |
| 2011/0045910 A1 | 2/2011 | McKenna et al. |
| 2011/0060825 A1 | 3/2011 | Ooe et al. |
| 2011/0070950 A1 | 3/2011 | Tanaka et al. |
| 2011/0143840 A1 | 6/2011 | Sotoike et al. |
| 2011/0176455 A1 | 7/2011 | Matsunada |
| 2011/0205953 A1 | 8/2011 | Kuwahara et al. |
| 2011/0231559 A1 | 9/2011 | Yamaguchi |
| 2011/0275358 A1 * | 11/2011 | Faenger ........................ 455/420 |
| 2011/0292033 A1 | 12/2011 | Umezu et al. |
| 2011/0295709 A1 | 12/2011 | Kubo et al. |
| 2011/0306294 A1 | 12/2011 | Yamazaki et al. |
| 2011/0307554 A1 | 12/2011 | Konno et al. |
| 2011/0307884 A1 | 12/2011 | Wabe |
| 2011/0307892 A1 | 12/2011 | Yamazaki et al. |
| 2012/0010000 A1 | 1/2012 | Masuda et al. |
| 2012/0011256 A1 * | 1/2012 | Masuda et al. ............... 709/227 |
| 2012/0021703 A1 | 1/2012 | Yamazaki et al. |
| 2012/0054297 A1 | 3/2012 | Konno et al. |
| 2012/0071242 A1 | 3/2012 | Fujiwara et al. |
| 2013/0295927 A1 * | 11/2013 | Ekici et al. .................... 455/434 |
| 2014/0164181 A1 | 6/2014 | Kubo et al. |
| 2014/0194189 A1 | 7/2014 | Kubo et al. |

FOREIGN PATENT DOCUMENTS

| | | |
|---|---|---|
| EP | 1 513 066 | 3/2005 |
| EP | 1 810 732 | 7/2007 |
| EP | 1 872 838 | 1/2008 |
| EP | 2 135 650 | 12/2009 |
| JP | 11-53184 | 2/1999 |
| JP | 11-207031 | 8/1999 |
| JP | 2000-167233 | 6/2000 |
| JP | 2000-181822 | 6/2000 |
| JP | 2000-249569 | 9/2000 |
| JP | 2001-231067 | 5/2001 |
| JP | 2001-175556 | 6/2001 |

(56) References Cited

FOREIGN PATENT DOCUMENTS

| | | |
|---|---|---|
| JP | 2002-027552 | 1/2002 |
| JP | 2002-102530 | 4/2002 |
| JP | 2002-159739 | 6/2002 |
| JP | 2002-253866 | 9/2002 |
| JP | 2002-297483 | 10/2002 |
| JP | 2003-023661 | 1/2003 |
| JP | 2003-050771 | 2/2003 |
| JP | 2003-196217 | 7/2003 |
| JP | 2003-219465 | 7/2003 |
| JP | 2003-229809 | 8/2003 |
| JP | 2004-057515 | 2/2004 |
| JP | 2004-221671 | 8/2004 |
| JP | 2004-329948 | 11/2004 |
| JP | 2004-348203 | 12/2004 |
| JP | 2005-018377 | 1/2005 |
| JP | 2005-028103 | 2/2005 |
| JP | 2005-242399 | 9/2005 |
| JP | 2005-242886 | 9/2005 |
| JP | 2005-266160 | 9/2005 |
| JP | 2006-005630 | 1/2006 |
| JP | 2006-072685 | 3/2006 |
| JP | 2006-101474 | 4/2006 |
| JP | 2006-146306 | 6/2006 |
| JP | 2006-228113 | 8/2006 |
| JP | 2007-507982 | 3/2007 |
| JP | 2007-088900 | 4/2007 |
| JP | 2007-125185 | 5/2007 |
| JP | 2007-142613 | 6/2007 |
| JP | 2007-164699 | 6/2007 |
| JP | 2007-175508 | 7/2007 |
| JP | 2007-330642 | 12/2007 |
| JP | 2008-113259 | 5/2008 |
| JP | 2008-125659 | 6/2008 |
| JP | 2008-136737 | 6/2008 |
| JP | 2008-142181 | 6/2008 |
| JP | 2008-153905 | 7/2008 |
| JP | 2008-160303 | 7/2008 |
| JP | 2008-206800 | 9/2008 |
| JP | 2009-015551 | 1/2009 |
| JP | 2009-26178 | 2/2009 |
| JP | 2009-065306 | 3/2009 |
| JP | 2009-512239 | 3/2009 |
| JP | 2009-147828 | 7/2009 |
| JP | 2005-251167 | 9/2009 |
| JP | 2009-225000 | 10/2009 |
| JP | 2010-022704 | 2/2010 |
| JP | 2010-028171 | 2/2010 |
| JP | 2010-028672 | 2/2010 |
| JP | 2010-079546 | 4/2010 |
| JP | 2010-86327 | 4/2010 |
| JP | 4573113 | 8/2010 |
| JP | 2011-509541 | 3/2011 |
| WO | 2005/111815 | 11/2005 |
| WO | 2009/048473 | 4/2009 |
| WO | 2009/148781 | 12/2009 |
| WO | 2010/010645 | 1/2010 |

OTHER PUBLICATIONS

Konno et al., U.S. Appl. No. 12/816,672, filed Jun. 16, 2010.
Ooe et al., U.S. Appl. No. 12/871,243, filed Aug. 30, 2010.
Kubo et al., U.S. Appl. No. 12/940,426, filed Nov. 5, 2010.
Yamazaki et al., U.S. Appl. No. 12/948,050, filed Nov. 17, 2010.
Yamazaki et al., U.S. Appl. No. 12/948,371, filed Nov. 17, 2010.
Fujiwara et al., U.S. Appl. No. 12/969,855, filed Dec. 16, 2010.
Wabe et al., U.S. Appl. No. 13/027,723, filed Feb. 15, 2011.
Konno et al., U.S. Appl. No. 13/101,811, filed May 5, 2011.
Konno et al., U.S. Appl. No. 13/251,204, filed Oct. 1, 2011.
Yamazaki et al., U.S. Appl. No. 13/251,205, filed Oct. 1, 2011.
Dragon Quest Monsters Joker 2, Weekly Famitsu, ENTERBRAIN, INC., Apr. 22, 2010, vol. 25, No. 18, Serial No. 1116, pp. 115-119, with a partial English translation, 8 pages.
Dragon Quest Monsters Joker 2, Nintendo DREAM, Mainichi Communications, Inc., Jul. 1, 2010, vol. 15, No. 7, Serial No. 195, pp. 52-59, with a partial English translation, 12 pages.
Game Broadway STAGE27, Gamaga, SOFTBANK Creative Corp., Jun. 1, 2010, vol. 27, No. 6, Serial No. 475, pp. 36-37, with a partial English translation, 6 pages.
English-language machine translation of JP 11-207031.
English-language machine translation of JP 2006-005630.
English-language machine translation of JP 2006-228113.
English-language machine translation of JP 2007-330642.
English-language machine translation of JP 2008-113259.
English-language machine translation of JP 2008-160303.
English-language machine translation of JP 2009-026178.
English-language machine translation of JP 2007-125185.
Konno et al., U.S. Appl. No. 12/816,672, filed Jun. 16, 2010—non-final office action mailed Sep. 12, 2013.
Ooe et al., U.S. Appl. No. 12/871,243, filed Aug. 30, 2010—RCE filed Nov. 29, 2013.
Kubo et al., U.S. Appl. No. 12/940,426, filed Nov. 5, 2010—allowed.
Yamazaki et al., U.S. Appl. No. 12/948,050, filed Nov. 17, 2010—now USP 8,433,375.
Yamazaki et al., U.S. Appl. No. 12/948,371, filed Nov. 17, 2010—now USP 8,505,008.
Fujiwara et al., U.S. Appl. No. 12/969,855, filed Dec. 16, 2010—awaiting USPTO action.
Wabe et al., U.S. Appl. No. 13/027,723, filed Feb. 15, 2011—non-final office action mailed Dec. 9, 2013.
Konno et al., U.S. Appl. No. 13/101,811, filed May 5, 2011—final office action mailed Sep. 18, 2013.
Konno et al., U.S. Appl. No. 13/251,204, filed Oct. 1, 2011—response to office action filed Sep. 25, 2013.
Yamazaki et al., U.S. Appl. No. 13/251,205, filed Oct. 1, 2011—non-final office action mailed Sep. 12, 2013.
English-language machine translation of JP 2002-102530.
Dissidia Final Fantasy Ultimania, Japan, Square Enix Co., Ltd., Feb. 19, 2009, First Edition, p. 502-503 and partial English-language translation thereof.
Miki, "Oideyo Doubutsu No Mom Kanpeki Guidebook", First edition, ENTERBRAIN, INC., Hamamura Kouichi, Jan. 9, 2006, First edition, with a partial English translation, 6 pages.
Ooe et al., U.S. Appl. No. 12/871,243, filed Aug. 30, 2010—allowed.
Kubo et al., U.S. Appl. No. 12/940,426, filed Nov. 5, 2010—RCE filed Jul. 22, 2013.
Wabe et al., U.S. Appl. No. 13/027,723, filed Feb. 15, 2011—RCE filed Oct. 21, 2013.
English-language machine translation of JP2002-297483.
English-language machine translation of JP2005-242886.
English-language machine translation of JP2006-146306.
English-language machine translation of JP2009-225000.
English-language machine translation of JP2010-079546.
Saeki, K., "Apparent and Substantial Improvement in Function! Report on Nintendo DSi Giving Impression of Development," Impress Watch Corporation, GAME Watch, uploaded on Nov. 1, 2008 [retrieved Feb. 4, 2014]; http://game.watch.impress.co.jp/docs/20081101/dsi1.htm with partial English-language translation thereof.
English-language machine translation of http://game.watch.impress.co.jp/docs/20081101/dsi1.htm [retrieved Apr. 15, 2014].
English-language machine translation of JP 2000-167233.
English-language machine translation of JP 2006-072685.
English-language machine translation of JP 2007-164699.
English-language machine translation of JP 2004-221671.
English-language machine translation of JP 2010-028672.
English-language machine translation of JP 2007-175508.
English-language machine translation of JP 2010-028171.
Konno et al., U.S. Appl. No. 12/816,672, filed Jun. 16, 2010—final office action mailed Jul. 7, 2014.
Ooe et al., U.S. Appl. No. 12/871,243, filed Aug. 30, 2010—non-final office action mailed May 28, 2014.
Kubo et al., U.S. Appl. No. 12/940,426, filed Nov. 5, 2010—now USP 8,700,478.
Fujiwara et al., U.S. Appl. No. 12/969,855, filed Dec. 16, 2010—non-final office action mailed Jun. 13, 2014.
Wabe et al., U.S. Appl. No. 13/027,723, filed Feb. 15, 2011—final office action mailed Apr. 28, 2014.

(56) References Cited

OTHER PUBLICATIONS

Konno et al., U.S. Appl. No. 13/101,811, filed May 5, 2011—non-final office action mailed Jul. 14, 2014.
Konno et al., U.S. Appl. No. 13/251,204, filed Oct. 1, 2011—allowed.
Yamazaki et al., U.S. Appl. No. 13/251,205, filed Oct. 1, 2011—RCE filed May 11, 2014.
Kubo et al., U.S. Appl. No. 14/181,690, filed Feb. 16, 2014—awaiting USPTO action.
Kubo et al., U.S. Appl. No. 14/181,692, filed Feb. 16, 2014—awaiting USPTO action.
Yamazaki et al., U.S. Appl. No. 14/334,520, filed Jul. 17, 2014—awaiting USPTO action.

* cited by examiner

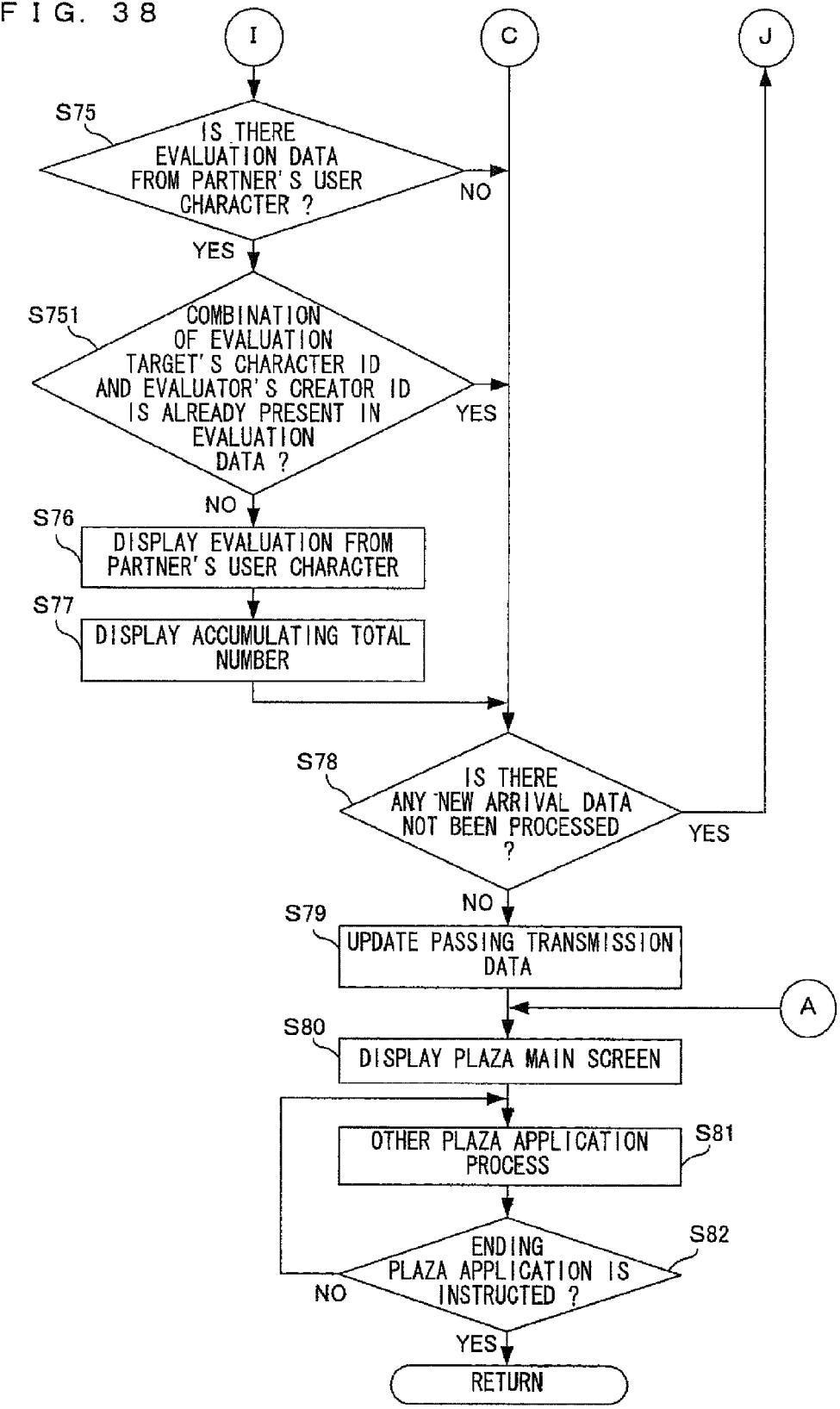

F I G. 3 9
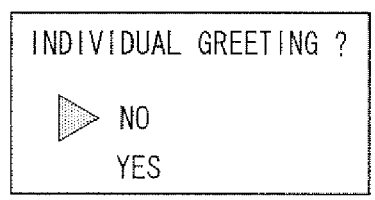

COMMUNICATION SYSTEM, COMPUTER-READABLE STORAGE MEDIUM HAVING STORED THEREON INFORMATION PROCESSING PROGRAM, INFORMATION PROCESSING METHOD, INFORMATION PROCESSING APPARATUS, AND INFORMATION PROCESSING SYSTEM

CROSS REFERENCE TO RELATED APPLICATION

The disclosure of Japanese Patent Application No. 2010-293960, filed on Dec. 28, 2010, is incorporated herein by reference.

BACKGROUND OF THE INVENTION

1. Field of the Invention

The present invention relates to a communication system and information processing using a communication function, and in particular, relates to a communication system and information processing using a short-distance wireless communication.

2. Description of the Background Art

Conventionally, a technology is known that allows a user to create a message such as news or an advertisement to be transmitted to an unspecified number of people and that allows the created message to be automatically transmitted to other hand-held terminals in a communicable range of wireless communication using weak radio waves (for example, Japanese Laid-open Patent Publication No. 2000-181822).

However, in the system disclosed in Japanese Laid-open Patent Publication No. 2000-181822, an identical message is continued to be transmitted to every hand-held terminal. Accordingly, the user does not have a feeling of communicating with users having other hand-held terminals very much, and the communication with the other hand-held terminals is monotonous. The applicant has found that there is room for improvement in enhancing fun of communication between hand-held terminals using a short-distance wireless communication.

SUMMARY OF THE INVENTION

Therefore, an object of the present invention is to provide a system that can activate the communication between information processing apparatuses using a short-distance wireless communication.

In order to attain the above object, the present invention has adopted the following configuration A communication system according to the present aspect is directed to a communication system which includes a plurality of information processing apparatuses, each of the plurality of information processing apparatuses including: storage means, communication means, and control means. The storage means stores first data to be transmitted to another information processing apparatus. The communication means repeatedly searches for another information processing apparatus in a communicable range of a short-distance wireless communication, automatically establishes wireless communication therewith, automatically transmits the first data to the other information processing apparatus with which the wireless communication has been established, and automatically receives first data transmitted from the other information processing apparatus with which the wireless communication has been established. The control means permits the communication means to transmit second data which is different from the first data to the other information processing apparatus with which the transmission/reception of the first data has been performed by the communication means before.

According to the above configuration, with respect to a partner with whom transmission/reception of data by means of a short-distance wireless communication has been performed, it is possible to send data different from the data that has been transmitted/received before. Therefore, it is possible to prevent communication with others using a short-distance wireless communication from becoming dry-as-dust, and it is possible to activate communication with others. In other words, for example, when a plurality of times of short-distance wireless communication are performed with an unknown person, a feeling of closeness is enhanced through transmission/reception of individual data addressed to the person, and thus, the possibility of becoming friends with the person is enhanced. Accordingly, it is possible to activate communication.

A computer-readable storage medium having stored thereon an information processing program to be executed by a computer of an information processing apparatus connected to storage means storing first data to be transmitted to another information processing apparatus according to the present aspect causes the computer to function as: communication means, and control means. The communication means repeatedly searches for another information processing apparatus in a communicable range of a short-distance wireless communication, automatically establishes wireless communication therewith, automatically transmits the first data to the other information processing apparatus with which the wireless communication has been established, and automatically receives first data transmitted from the other information processing apparatus with which the wireless communication has been established. The control means permits the communication means to transmit second data which is different from the first data to the other information processing apparatus with which the transmission/reception of the first data has been performed by the communication means before.

According to the above configuration, with respect to a partner with whom transmission/reception of data by means of a short-distance wireless communication has been performed, it is possible to send data different from the data that has been transmitted/received before. Therefore, it is possible to prevent communication with others using a short-distance wireless communication from becoming dry-as-dust, and to activate communication with others.

As another configuration example, the first data may be data to be transmitted to an unspecified other information processing apparatus, and the second data may be data to be transmitted to a specific other information processing apparatus According to the above configuration example, data that does not specify a partner, for example, data for an unspecified number of partners or for a whole group; and individual data that specifies a partner are used. Accordingly, it is possible to prevent communication with others using a short-distance wireless communication from becoming dry-as-dust, and to activate communication with others.

As still another configuration example, in a case where the transmission of the second data is permitted by the control means, the communication means may automatically transmit the second data to the other information processing apparatus corresponding to the second data by means of the short-distance wireless communication.

According to the above configuration example, with respect to a partner with whom transmission/reception of data by means of a short-distance wireless communication has been performed, it is possible to send data different from the data that has been transmitted/received before. Therefore, it is possible to activate communication with others.

As still another configuration example, the control means may permit the communication means to transmit the second data by permitting a user to create the second data.

According to the above configuration example, for example, the user can create special data to a partner whom the user often passes by. Therefore, it is possible to further activate communication.

As still another configuration example, the computer may further be caused to function as display control means for causing a display device to display a content based on the first data received by the reception means. After the content is displayed by the display control means, the control means may permit a user to create the second data.

According to the above configuration example, as a reply to data to an unspecified partner, data addressed to the specific partner can be created. Therefore, it is possible to enhance the smoothness of the communication.

As still another configuration example, the first data and the second data may be character string data, and the control means may cause citation data to be included in the second data, the citation data indicating the content of the first data or a content of the second data received by the reception means and displayed by the display control means when the second data is created.

According to the above configuration example, in a case where the received data is data addressed to the user, it is possible to allow the user to know to what kind of data sent from the user the received reply is made in response. Therefore, it is possible to enhance the smoothness of the communication.

As still another configuration example, the first data may be data that has been created in advance before communication with the other information processing apparatus is performed for the first time by the communication means, and the second data may be capable of being created only after the first data or the second data received from the other information processing apparatus is displayed by the display control means.

According to the above configuration example, for example, by preparing in advance a message to an unspecified partner as a fixed phrase, it is possible to reduce the work of the user. By allowing the user to create a message for a specific partner each time when the user is allowed to, a message to the specific partner can be created flexibly.

As still another configuration example, the computer may further be caused to function as selection means for selecting one of the first data and the second data as data to be transmitted next time to the other information processing apparatus with which the transmission/reception of the first data has been performed by the communication means before. The control means may permit the user to create the second data in a case where the second data is selected by the selection means.

According to the above configuration example, with respect to a partner with whom the user has performed short-distance wireless communication several times, it is possible to allow the user to select whether to send data for un unspecified partner or data addressed to the partner who is specified as the destination. As a result, with respect to a partner with whom the user has performed short-distance wireless communication several times, the user is allowed not to necessarily crate and send data to the partner who is specified as the destination. Therefore, it is possible to improve the usability for the user.

As still another configuration example, the communication means may automatically transmit image data of a character and the first data to the other information processing apparatus with which the wireless communication has been established, and automatically receive image data of a character and the first data transmitted from the other information processing apparatus with which the wireless communication has been established, and the control means may permit the communication means to transmit the second data to the other information processing apparatus with which the transmission/reception of the image data of the character and the first data corresponding to the image data has been performed by the communication means before.

According to the above configuration example, by using image data of a character, it is possible to allow the user to easily convey an image of the communication partner by means of the image data. Therefore, it is possible to enhance the smoothness of the communication.

As still another configuration example, the computer may further be caused to function as: display control means for causing a display device to display a content of the first data or the second data received by the reception means; selection means for allowing, with respect to another information processing apparatus with which the transmission/reception of the first data has not been performed by the communication means before, selection only of the first data as data to be transmitted next time, and for allowing, with respect to said other information processing apparatus with which the transmission/reception of the first data has been performed by the communication means before, selection of one of the first data and the second data as data to be transmitted next time to said other information processing apparatus by the communication means.

According to the above configuration example, for example, with respect to a partner who is met for the first time, an unknown partner, or a partner who is not in a friendly relationship, a neutral message may be transmitted as data to un unspecified partner, and only after short-distance wireless communication have been performed several times with the partner, an individual message may be created as data addressed to the specific partner. Accordingly, a partner with whom the user may become friends can be extracted from an unspecified number of persons, and an individual message can be sent to such a partner. Therefore, it is possible to activate communication and enhance the smoothness of the communication.

As still another configuration example, the control means may permit the user to input text as the second data.

According to the above configuration example, text data can be transmitted as data addressed to the specific partner. Accordingly, for example, it is possible to create and transmit a special message to a partner whom the user often passes by.

An information processing method according to the present aspect is directed to an information processing method for transmitting data to another information processing apparatus, the data being stored in storage means, the information processing method including: a communication step, and a control step. The communication step repeatedly searches for another information processing apparatus in a communicable range of a short-distance wireless communication, automatically establishes wireless communication therewith, automatically transmits first data stored in the storage means to the other information processing apparatus with which the wireless communication has been established, and automatically receives first data transmitted from the other information processing apparatus with which the wireless communication has been established. The control step permits transmitting, in the communication step, second data which is different from the first data to the other information processing apparatus with which the transmission/reception of the first data has been performed in the communication step before.

An information processing apparatus according to the present aspect is directed to an information processing apparatus connected to storage means storing first data to be transmitted to another information processing apparatus, the information processing apparatus including: communication means and control means. The communication means repeatedly searches for another information processing apparatus in a communicable range of a short-distance wireless communication, automatically establishes wireless communication therewith, automatically transmits the first data to the other information processing apparatus with which the wireless communication has been established, and automatically receives first data transmitted from the other information processing apparatus with which the wireless communication has been established. The control means permits the communication means to transmit second data which is different from the first data to the other information processing apparatus with which the transmission/reception of the first data has been performed by the communication means before.

An information processing system according to the present aspect is directed to an information processing system connected to storage means storing first data to be transmitted to another information processing system, the information processing system including: communication means and control means. The communication means repeatedly searches for another information processing apparatus in a communicable range of a short-distance wireless communication, automatically establishes wireless communication therewith, automatically transmits the first data to the other information processing system with which the wireless communication has been established, and automatically receives first data transmitted from the other information processing system with which the wireless communication has been established. The control means permits the communication means to transmit second data which is different from the first data to the other information processing system with which the transmission/reception of the first data has been performed by the communication means before.

According to the present invention, it is possible to further activate communication between information processing apparatuses using a short-distance wireless communication.

These and other objects, features, aspects and advantages of the present invention will become more apparent from the following detailed description of the present invention when taken in conjunction with the accompanying drawings.

BRIEF DESCRIPTION OF THE DRAWINGS

FIG. 38 is a flow chart showing in detail the plaza application main process; and FIG. 39 is an example of a greeting selection window 105.

DESCRIPTION OF THE PREFERRED EMBODIMENTS

Hereinafter, an embodiment of the present invention will be described with reference to the drawings. Note that the present invention is not limited to this embodiment.

Figure 1:
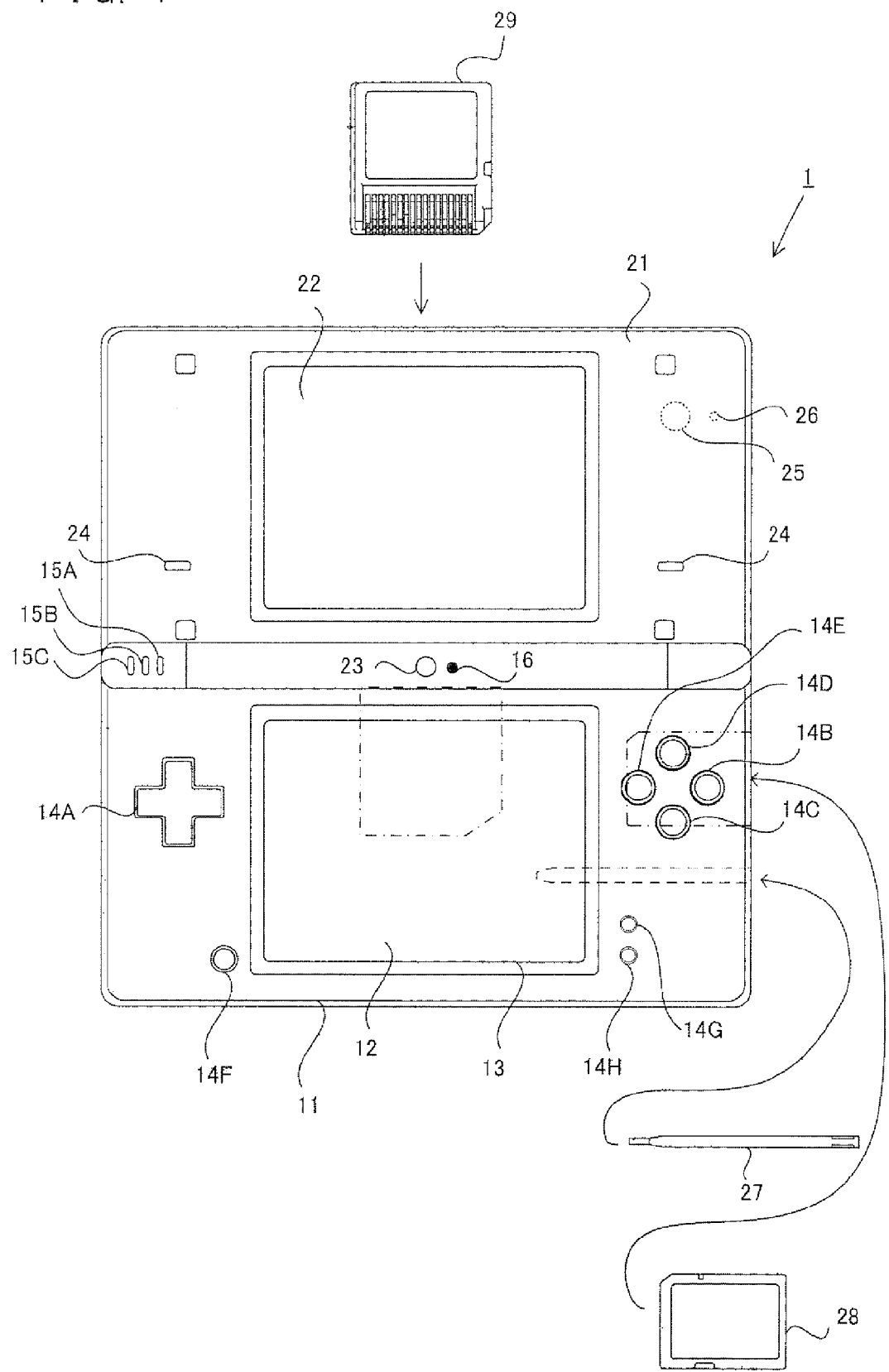
FIG. 1 is an external view of a game apparatus 1 for executing a plaza application and the like according to the embodiment.

FIG. 1 is an external view of a game apparatus 1 for executing a plaza application and the like according to this embodiment. Here, a hand-held game apparatus is shown as one example the game apparatus 1. In FIG. 1, the game apparatus 1 is a foldable hand-held game apparatus in an opened state. The game apparatus 1 is configured to have such a size as to be held by a user with one hand or both hands in the opened state.

The game apparatus 1 includes a lower housing 11 and an upper housing 21. The lower housing 11 and the upper housing 21 are connected to each other so as to be capable of being opened or closed (foldable). In the example of FIG. 1, the lower housing 11 and the upper housing 21 are each formed in a plate-like shape of a horizontally long rectangle, and rotatably connected to each other at long side portions thereof. Normally, the user uses the game apparatus 1 in the opened state. When not using the game apparatus 1, the user keeps the game apparatus 1 in a closed state. In the example shown in FIG. 1, in addition to the closed state and the opened state, the game apparatus 1 is capable of maintaining an angle between the lower housing 11 and the upper housing 21 at any angle ranging between the closed state and the opened state by frictional force generated at a connection portion and the like. In other words, the upper housing 21 can be stationary at any angle with respect to the lower housing 11.

In the lower housing 11, a lower LCD (Liquid Crystal Display) 12 is provided. The lower LCD 12 has a horizontally long shape, and is located such that a long side thereof corresponds to a long side direction of the lower housing 11. Note that although an LCD is used as a display device built-in the game apparatus 1 in the present embodiment, any other display devices such as a display device using an EL (Electro Luminescence) and the like may be used. In addition, the game apparatus 1 can use a display device of any resolution. Although details will be described below, the lower LCD 12 is used mainly for displaying an image taken by an inner camera 23 or an outer camera 25 in real time.

In the lower housing 11, operation buttons 14A to 14K and a touch panel 13 are provided as input devices. As shown in FIG. 1, among the operation buttons 14A to 14K, the direction input button 14A, the operation button 14B, the operation button 14C, the operation button 14D, the operation button 14E, the power button 14F, the start button 14G, and the select button 14H are provided on an inner main surface of the lower housing 11 which is located inside when the upper housing 21 and the lower housing 11 are folded. The direction input button 14A is used, for example, for a selection operation and the like. The operation buttons 14B to 14E are used, for example, for a determination operation, a cancellation operation, and the like. The power button 14I is used for turning on or off the power of the game apparatus 1. In the example shown in FIG. 1, the direction input button 14A and the power button 14F are provided on the inner main surface of the lower housing 11 and on one of a left side and a right side (on the left side in FIG. 1) of the lower LCD 12 provided in the vicinity of the center of the inner main surface of the lower housing 11. Further, the operation buttons 14B to 14E, the start button 14G, and the select button 14H are provided on the inner main surface of the lower housing 11 and on the other of the left side and the right side (on the right side in FIG. 1) of the lower LCD 12. The direction input button 14A, the operation buttons 14B to 14E, the start button 14G, and the select button 14H are used for performing various operations on the game apparatus 1.

Note that the operation buttons 14I to 14K are omitted in FIG. 1. For example, the L button 14I is provided at a left end of an upper surface of the lower housing 11, and the R button 14J is provided at a right end of the upper surface of the lower housing 11. The L button 14I and the R button 14J are used, for example, for performing a photographing instruction operation (shutter operation) on the game apparatus 1. In addition, the volume button 14K is provided on a left side surface of the lower housing 11. The volume button 14K is used for adjusting volume of loudspeakers of the game apparatus 1.

The game apparatus 1 further includes the touch panel 13 as another input device in addition to the operation buttons 14A to 14K. The touch panel 13 is mounted on the lower LCD 12 so as to cover the screen of the lower LCD 12. In the present embodiment, the touch panel 13 is, for example, a resistive film type touch panel. However, the touch panel 13 is not limited to the resistive film type, but any press-type touch panel may be used. The touch panel 13 used in the present embodiment has the same resolution (detection accuracy) as that of the lower LCD 12. However, the resolution of the touch panel 13 and that of the lower LCD 12 may not necessarily be the same with each other. In a right side surface of the lower housing 11, an insertion opening (indicated by a dashed line in FIG. 1) is provided. The insertion opening is capable of accommodating a touch pen 27 which is used for performing an operation on the touch panel 13. Although an input onto the touch panel 13 is usually performed using the touch pen 27, in addition to the touch pen 27, a finger of the user can be used for operating the touch panel 13.

In the right side surface of the lower housing 11, an insertion opening (indicated by a two-dot chain line in FIG. 1) is formed for accommodating a memory card 28. Inside the insertion opening, a connector (not shown) is provided for electrically connecting the game apparatus 1 to the memory card 28. The memory card 28 is, for example, an SD (Secure Digital) memory card, and detachably mounted on the connector. The memory card 28 is used, for example, for storing an image taken by the game apparatus 1, and loading an image generated by another apparatus into the game apparatus 1.

Further, in the upper surface of the lower housing 11, an insertion opening (indicated by a chain line in FIG. 1) is formed for accommodating a cartridge 29. Inside the insertion opening, a connector (not shown) is provided for electrically connecting the game apparatus 1 to the cartridge 29. The cartridge 29 is a storage medium storing a game program and the like, and detachably mounted in the insertion opening provided in the lower housing 11.

Three LEDs 15A to 15C are mounted on a left side part of the connection portion where the lower housing 11 and the upper housing 21 are connected to each other. The game apparatus 1 is capable of performing wireless communication with another apparatus, and the first LED 15A is lit up while the power of the game apparatus 1 is ON. The second LED 15B is lit up while the game apparatus 1 is being charged. The third LED 15C is lit up while wireless communication is established. Thus, by the three LEDs 15A to 15C, a state of ON/OFF of the power of the game apparatus 1, a state of charge of the game apparatus 1, and a state of communication establishment of the game apparatus 1 can be notified to the user.

Meanwhile, in the upper housing 21, an upper LCD 22 is provided. The upper LCD 22 has a horizontally long shape, and is located such that a long side direction thereof corresponds to a long side direction of the upper housing 21. In a similar manner to that of the lower LCD 12, a display device of another type having any resolution may be used instead of the upper LCD 22. A touch panel may be provided so as to cover the upper LCD 22. On the upper LCD 22, for example, an operation explanation screen for teaching the user roles of the operation buttons 14A to 14K and the touch panel 13 is displayed.

In the upper housing 21, two cameras (the inner camera 23 and the outer camera 25) are provided. As shown in FIG. 1, the inner camera 23 is mounted in an inner main surface in the vicinity of the connection portion of the upper housing 21. On the other hand, the outer camera 25 is mounted in a surface opposite to the surface in which the inner camera 23 is mounted, namely, in an outer main surface of the upper housing 21 (which is the surface located on the outside of the game apparatus 1 in the closed state, and the back surface of the upper housing 21 shown in FIG. 1). In FIG. 1, the outer camera 25 is indicated by a dotted line. Thus, the inner camera 23 is capable of taking an image in a direction in which the inner main surface of the upper housing 21 faces, and the outer camera 25 is capable of taking an image in a direction opposite to an imaging direction of the inner camera 23, namely, in a direction in which the outer main surface of the upper housing 21 faces. In other words, in the present embodiment, the two cameras 23 and 25 are provided such that the imaging directions thereof are opposite to each other. For example, the user can take an image of a view seen from the game apparatus 1 toward the user with the inner camera 23 as well as an image of a view seen from the game apparatus 1 in a direction opposite to the user with the outer camera 25.

In the inner main surface in the vicinity of the connection portion, a microphone (a microphone 42 shown in FIG. 2) is accommodated as a voice input device. In the inner main surface in the vicinity of the connection portion, a microphone hole 16 is formed to allow the microphone 42 to detect sound outside the game apparatus 1. The accommodating position of the microphone 42 and the position of the microphone hole 16 are not necessarily in the connection portion. For example, the microphone 42 may be accommodated in the lower housing 11, and the microphone hole 16 may be formed in the lower housing 11 so as to correspond to the accommodating position of the microphone 42.

In the outer main surface of the upper housing 21, a fourth LED 26 (indicated by a dashed line in FIG. 1) is mounted. The fourth LED 26 is lit up at a time when photographing is performed (when the shutter button is pressed) with the outer camera 25. Further, the fourth LED 26 is lit up while a moving picture is being taken by the outer camera 25. By the fourth LED 26, it is notified to an object person whose image is taken and people around the object person that photographing is performed (being performed) by the game apparatus 1.

Sound holes 24 are formed in the inner main surface of the upper housing 21 and on left and right sides, respectively, of the upper LCD 22 provided in the vicinity of the center of the inner main surface of the upper housing 21. The loudspeakers are accommodated in the upper housing 21 and at the back of the sound holes 24. The sound holes 24 are for releasing sound from the speakers to the outside of the game apparatus 1 therethrough.

As described above, the inner camera 23 and the outer camera 25 which are components for taking an image, and the upper LCD 22 which is display means for displaying, for example, an operation explanation screen at the time of photographing are provided in the upper housing 21. On the other hand, the input devices for performing an operation input on the game apparatus 1 (the touch panel 13 and the buttons 14A to 14K), and the lower LCD 12 which is display means for displaying the game screen are provided in the lower housing 11. Accordingly, when using the game apparatus 1, the user can hold the lower housing 11 and perform an input on the input device while seeing a taken image (an image taken by one of the cameras) displayed on the lower LCD 12.

Figure 2:
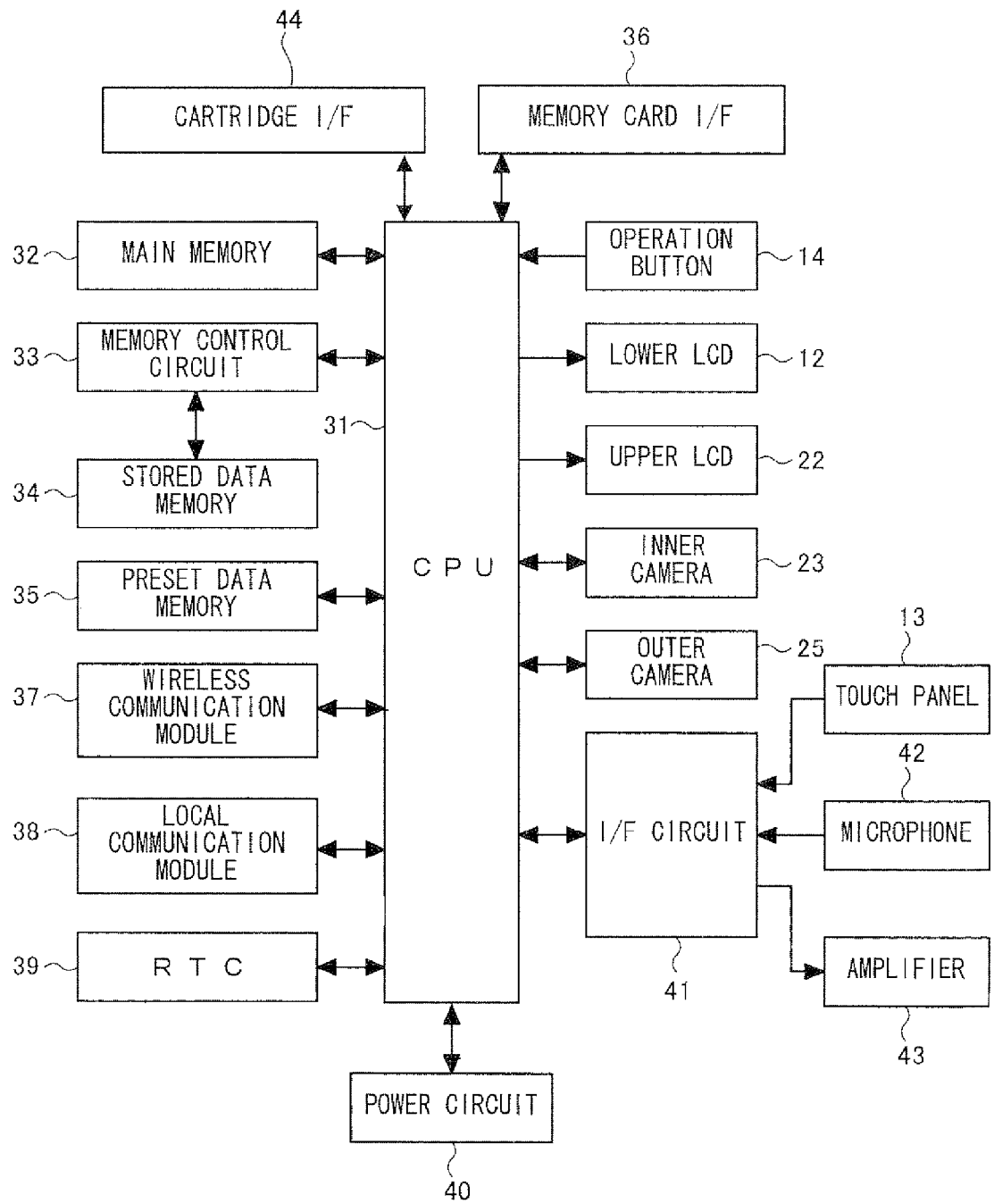
FIG. 2 is a block diagram showing an example of an internal configuration of the game apparatus 1.

Next, an internal configuration of the game apparatus 1 will be described with reference to FIG. 2. FIG. 2 is a block diagram showing one example of the internal configuration of the game apparatus 1.

As shown in FIG. 2, the game apparatus 1 includes electronic components including a CPU 31, a main memory 32, a memory control circuit 33, a stored data memory 34, a preset data memory 35, a memory card interface (memory card I/F) 36 and a cartridge I/F 44, a wireless communication module 37, a local communication module 38, a real time clock (RTC) 39, a power circuit 40, an interface circuit (I/F circuit) 41, and the like. These electronic components are mounted on an electronic circuit substrate and accommodated in the lower housing 11 (or may be accommodated in the upper housing 21).

The CPU 31 is information processing means for executing a predetermined program. Note that a program executed by the CPU 31 may be stored in advance in a stored data memory 34 within the game apparatus 1, may be obtained from the memory card 28 and/or the cartridge 29, or may be obtained from another apparatus by means of communication with said another apparatus. For example, a program may be obtained by means of download via the Internet from a predetermined server, or may be obtained by downloading a predetermined program stored in a stationary game apparatus through communication therewith.

The main memory 32, the memory control circuit 33, and the preset data memory 35 are connected to the CPU 31. The stored data memory 34 is connected to the memory control circuit 33. The main memory 32 is storage means used as a work area and a buffer area of the CPU 31. In the present embodiment, for example, a PSRAM (Pseudo-SRAM) is used as the main memory 32. The stored data memory 34 is storage means for storing a program executed by the CPU 31, data of images taken by the inner camera 23 and the outer camera 25, and the like. The stored data memory 34 is constructed of a nonvolatile storage medium, for example, a NAND flash memory, in the present embodiment. The memory control circuit 33 is a circuit for controlling reading of data from the stored data memory 34 or writing of data to the stored data memory 34 in accordance with an instruction from the CPU 31. The preset data memory 35 is storage means for storing, in the game apparatus 1, data (preset data) of various parameters and the like which are set in advance. A flash memory connected to the CPU 31 via an SPI (Serial Peripheral Interface) bus can be used as the preset data memory 35.

The memory card I/F 36 is connected to the CPU 31. The memory card I/F 36 reads data from the memory card 28 mounted on the connector or writes data to the memory card 28 in accordance with an instruction from the CPU 31. In the present embodiment, data of images taken by the outer camera 25 is written to the memory card 28, and image data stored in the memory card 28 is read from the memory card 28 to be stored in the stored data memory 34.

The cartridge I/F 44 is connected to the CPU 31. The cartridge I/F 44 reads out data from the cartridge 29 mounted to the connector or writes data to the cartridge 29 in accordance with an instruction from the CPU 31. In the embodiment, an application program that can be executed by the game apparatus 1 is read from the cartridge 29 and then executed by the CPU 31, and data concerning the application program (for example, saved data of the game) is written to the cartridge 29.

It is assumed that that a plaza application processing program according to the present invention is stored in advance in the stored data memory 34 as a preinstalled application of the game apparatus 1. However, the plaza application processing program may be provided via a wired or wireless communication line to the computer system.

The wireless communication module 37 functions to connect to a wireless LAN device, for example, by a method conformed to the standard of IEEE802.11.b/g. The local communication module 38 functions to wirelessly communicate with a game apparatus of the same type by a predetermined communication method. The wireless communication module 37 and the local communication module 38 are connected to the CPU 31. The CPU 31 is capable of receiving data from and transmitting data to another apparatus via the Internet using the wireless communication module 37, and capable of receiving data from and transmitting data to another game apparatus of the same type using the local communication module 38. For example, the CPU 31 can repeatedly search for another game apparatus in a communicable range of a short-distance wireless communication by using the local communication module 38 (for example, the distance between the apparatuses is several ten meters) and automatically establish wireless communication therewith, and automatically transmit data to and receive data from the wirelessly connected other game apparatus.

The RTC 39 and the power circuit 40 are connected to the CPU 31. The RTC 39 counts a time, and outputs the time to the CPU 31. For example, the CPU 31 is capable of calculating a current time (date) and the like based on the time counted by the RTC 39. The power circuit 40 controls electric power from a power supply (typically, a battery accommodated in the lower housing 11) of the game apparatus 1 to supply the electric power to each electronic component of the game apparatus 1.

Here, in the embodiment, there are two states called "normal operation mode" and "sleep mode", which are operation states of the game apparatus 1 when the power is not turned off. The "normal mode" is a state where the game apparatus 1 is open and the power is supplied to all of the components of the game apparatus 1. In other words, the "normal mode" is a state where the user is directly operating the game apparatus 1. The "sleep mode" is a state where the game apparatus 1 is closed (folded) but the power is supplied to some of the components, such as the CPU 31, and the user is not directly operating the game apparatus 1 but processing can be performed by the CPU 31. In the embodiment, in the "sleep mode", communications called "passing communication" using the local communication module 38 is performed (detailed description thereof will be given below).

The game apparatus 1 includes the microphone 42 and an amplifier 43. The microphone 42 and the amplifier 43 are connected to the I/F circuit 41. The microphone 42 detects voice produced by the user toward the game apparatus 1, and outputs a sound signal indicating the voice to the I/F circuit 41. The amplifier 43 amplifies the sound signal from the I/F circuit 41, and causes the speakers (not shown) to output the sound signal. The I/F circuit 41 is connected to the CPU 31.

The touch panel 13 is connected to the I/F circuit 41. The I/F circuit 41 includes a sound control circuit for controlling the microphone 42 and the amplifier 43 (the speakers), and a touch panel control circuit for controlling the touch panel 13. The sound control circuit performs A/D conversion or D/A conversion of the sound signal, and converts the sound signal into sound data in a predetermined format. The touch panel control circuit generates touch position data in a predetermined format based on a signal from the touch panel 13, and outputs the touch position data to the CPU 31. For example, the touch position data is data indicating coordinates of a position at which an input is performed on an input surface of the touch panel 13. The touch panel control circuit reads a signal from the touch panel 13 and generates touch position data every predetermined period of time. The CPU 31 is capable of recognizing a position at which an input is performed on the touch panel 13 by obtaining the touch position data via the I/F circuit 41.

An operation button 14 includes the above operation buttons 14A to 14K, and is connected to the CPU 31. The operation button 14 outputs operation data indicating an input state of each of the buttons 14A to 14K (whether or not each button is pressed) to the CPU 31. The CPU 31 obtains the operation data from the operation button 14, and performs processing in accordance with an input performed onto the operation button 14.

The inner camera 23 and the outer camera 25 are connected to the CPU 31. Each of the inner camera 23 and the outer camera 25 takes an image in accordance with an instruction from the CPU 31, and outputs data of the taken image to the CPU 31. In the present embodiment, the CPU 31 gives an imaging instruction to the inner camera 23 or the outer camera 25, and the camera which has received the imaging instruction takes an image and transmits image data to the CPU 31.

The lower LCD 12 and the upper LCD 22 are connected to the CPU 31. Each of the lower LCD 12 and the upper LCD 22 displays an image thereon in accordance with an instruction from the CPU 31.

Figure 3:
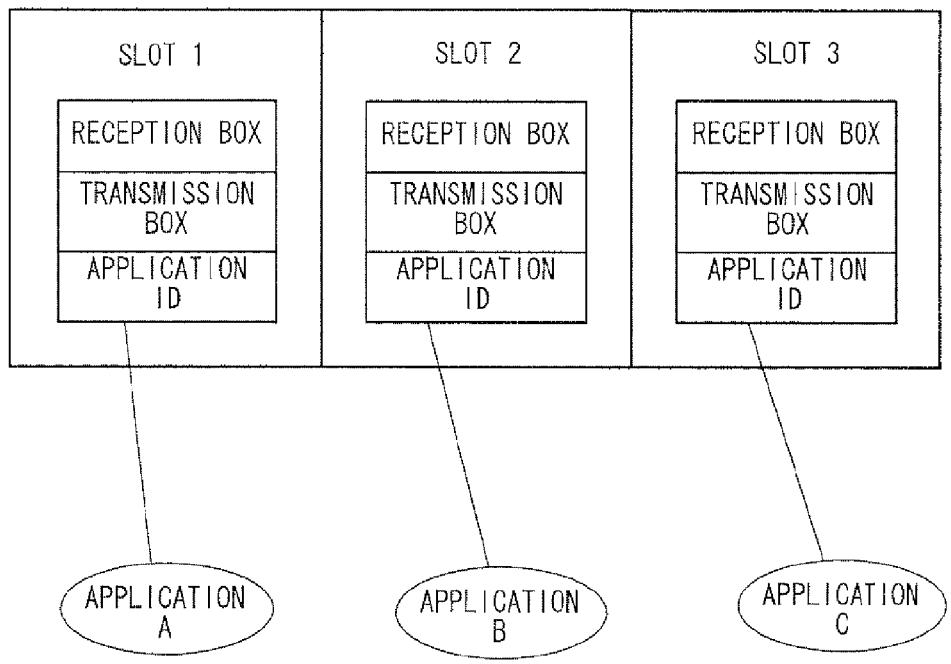
FIG. 3 is a diagram illustrating "passing communication" in the embodiment.
Figure 4:
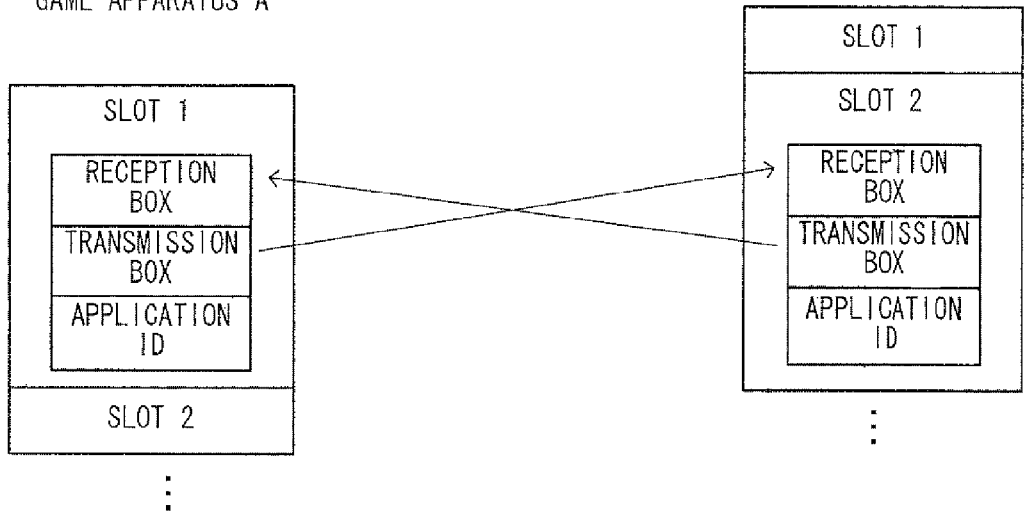
FIG. 4 is a diagram illustrating "passing communication" in the embodiment.

Hereinafter, an outline of processing of the plaza application and the like assumed in the embodiment will be described. Before the processing of the plaza application and the like are described, the outline of the "passing communication", of which performance is the premise of the processing, will be described. Each of FIG. 3 and FIG. 4 is a diagram illustrating the passing communication in the embodiment. In the embodiment, a storage area dedicated to the passing communication is provided in the stored data memory 34. The storage area is logically divided into a plurality of units, each being called a "slot". Each of the slots is associated with a given application. Each slot stores data of a "transmission box", a "reception box", and an "application ID". The application ID is data for identifying an application corresponding to the slot. The transmission box stores data to be transmitted to another game apparatus in the passing communication. The reception box stores data received from another game apparatus in the passing communication.

In the embodiment, it is assumed that the passing communication is performed while the game apparatus 1 is set in the sleep mode. For example, in such a case where a user goes out, carrying a game apparatus 1 in a closed state, and passes by another user carrying a game apparatus 1 in the same state, the following communication is performed. First, in the sleep mode, a beacon signal is transmitted from each game apparatus 1 at a predetermined cycle. Also, each game apparatus 1 searches for another game apparatus present in its communicable range. When the other game apparatus 1 is detected, either one of the game apparatuses 1, which functions as a leading apparatus with respect to the other game apparatus 1, establishes a link for passing communication between the game apparatuses 1 (hereinafter, such direct communication between the game apparatuses 1 will be referred to as "local communication"). When a state which allows such local communication is established, it is determined whether there are slots, in the respective game apparatuses, having the same application ID that has been registered. If such a slot having the same application ID is present in each game apparatus, data in the transmission box in the respective slots is transmitted to each other, as shown in FIG. 4. The data transmitted from the other game apparatus 1 is stored in the reception box. Then, the data received from the other game apparatus 1 and stored in the reception box will be read from the reception box at the time when the corresponding application is run, and will be used as appropriate in the application.

Next, an outline of processing of an application according to the embodiment will be described. The application according to the embodiment mainly includes two applications, that is, a "user character creation application" and the "plaza application". Each of these is executed as appropriate when a user selects it from a home menu which is a basic menu screen of the game apparatus 1 (for example, each application is executed when the user selects an icon representing the application).

The user character creation application is an application for allowing a user to create a character called "user character". In the embodiment, a user character is composed of a plurality of parts, which are categorized into, for example, "eye", "nose", "mouth", "contour", "hairstyle", and the like, respectively. Each category contains a plurality of parts in advance, which are stored in the game apparatus 1. The user can create a user character having, for example, a face which resembles the face of the user, by combining the parts by means of the user character creation application. The user character created by means of the user character creation application is stored in the stored data memory 34. It should be noted that a plurality of user characters may be created and stored. Further, the appearance and the like of a created user character may be edited (for example, parts are changed to different ones).

Meanwhile, the "plaza application" is an application whose main object is to collect user characters. The collection of user characters is performed through the passing communication. Specifically, a user character created by means of the user character creation application is transmitted to another game apparatus 1 through the passing communication as described above, and a user character created by another user is received. Thus, through repeated passing communication, user characters created by other users can be collected. Then, the user can browse the user characters created by other users, by means of the plaza application, and perform predetermined mini games using the user characters created by the user himself/herself and other users. Further, in the mini games, it is possible to obtain parts, for example, such as "accessories" which can change the appearance of a user character.

In the plaza application, it is possible to cause a user character created by the user to exchange "greetings" with another user character obtained through the passing communication. Hereinafter, processing concerning the greeting will be referred to as a "greeting process". Further, in the plaza application, it is possible to "evaluate" the other user character and send the result to the other user who created it. In the embodiment, with respect to the target of the evaluation, the appearance of the other user character is evaluated. Hereinafter, the process of the evaluation will be referred to as "evaluation process". Now, a general outline of the flow of operations of the plaza application including these processes will be described below.

As a typical process flow, the following is assumed. First, as an initial setting of the plaza application, a user character to be used in the passing communication is registered through an operation by the user. In the embodiment, it is assumed that the number of user characters which can be transmitted/received through the passing communication is one. Then, the user goes out, carrying the game apparatus 1 set in the sleep mode. While the user is out, when the user passes by several other users (to be more specific, users who have finished setting the passing communication for the plaza application), the passing communications as described above (transmission/reception of a user character) occur several times. Then, when the user comes back and runs the plaza application again, the number of times and the like of passing communications performed while the user was out this time are displayed as "new arrival notification". Then, with respect to other user characters obtained while the user was out this time, the "greeting process" and the "evaluation process" described below are performed, one by one in order. Then, when the "greeting process" and the "evaluation process" have been finished for all of said other user characters obtained while the user was out this time, a main screen of the plaza application is displayed. In other words, the "greeting process" and the "evaluation process" described in the embodiment are processes performed onto other user characters obtained through the passing communications (new arrival user characters, so to speak) performed from the time when the game apparatus was set to the sleep mode and to the time when the plaza application is run next. The outline of the processes will be described below.

[Initial Setting of Plaza Application]

First, when the plaza application is run for the first time (first-time run), an initial setting process for the plaza application is automatically started. In this process, a simple introduction of the contents of the plaza application is performed, and then setting of the passing communication and creation of a "common greeting" to be used in the greeting process (specifically, input of character string) are performed.

The setting items will be described in detail. Main setting items concerning the passing communication include a setting item, "whether to perform passing communication", a setting item, "whether to perform greeting process", a setting item, "whether to perform evaluation process", and a setting item that is a selection of a user character to be used in the passing communication. For each of these setting items, a screen asking the user whether to "perform" or "not perform" is displayed in the initial setting process, and each setting item is set by an input by the user.

In the embodiment, "perform" is set for the setting item, "whether to perform passing communication". As a result, one of the slots for the passing communication as described above (see FIG. 3) and the plaza application is associated with each other. Specifically, when an application ID indicating the plaza application is stored as the application ID of any one of the slots, the slot is associated with the plaza application. Further, selection of a user character to be transmitted in the passing communication is performed. Specifically, a list screen and the like of user characters are displayed, and the user performs an operation of selecting one of the user characters, whereby a user character to be used in the passing communication is selected. In a case where all of the slots are already being used by other applications, a message indicating to the effect is displayed as appropriate, and the association is not established at this moment. After any of the slots is released, the association is established. Further, in a case where no user character has been created, a message indicating to the effect and a message prompting the user to create a user character by means of the user character creation application are displayed as appropriate at the time of the user character selection.

With respect to the setting item, "whether to perform greeting process", and the setting item, "whether to perform evaluation process", an example where both of the user and the other user (hereinafter, the other user may be referred to as a partner) have set "perform" will be described in the embodiment Here, in the embodiment, only in a case where both of the user and the partner have set these setting items at "perform", the greeting process and the evaluation process are performed. That is, in a case where either one of the user and the partner has set "not perform" for the greeting process, the greeting process is not performed. Similarly, in a case where either one of the user and the partner has set "not perform" for "the evaluation process", the evaluation process is not performed. In this manner, a following case is prevented from occurring, in which although either one of the users does not want to perform the "greeting process" or does not want to be "evaluated", the greeting and the evaluation are forcibly performed and he or she feels uncomfortable. Therefore, for example, in a case where either one of the user and the partner has set "perform" for the greeting process but has set "not perform" for the evaluation process, the greeting process is performed but the evaluation process is not performed.

Next, before creation of the "common greeting" is described, general description will be given of the "greeting" used in the greeting process of the embodiment. In the greeting process of the embodiment, a process is performed in which another user character received through the passing communication and the user's user character exchange "greetings" with each other. As the "greeting", two kinds of greetings are defined in the embodiment. A first one is a greeting called "common greeting", and a second one is a greeting called "individual greeting". The "common greeting" is a greeting to an unspecified number of other users (other game apparatuses 1). That is, the "common greeting" is a greeting which is given indiscriminately, without specifying another user character in particular. For example, a greeting to all belonging to a group (all user characters) is also a "common greeting". Further, the "common greeting" may be a greeting to a large number of other user characters having a certain attribute. For example, the "common greeting" may be a greeting to other user characters whose sex is "male". On the other hand, the "individual greeting" is a greeting to a specific user (game apparatus 1). That is, the "individual greeting" is a greeting that the user intends to give to an individual partner. In other words, the "individual greeting" is a greeting which is intended to be given to another user character that the user has specified/appointed (as an intension of the user transmitting the greeting). In the embodiment, the "common greeting" is basically used. However, with respect to a partner with whom passing communications have been performed two times or more, the "individual greeting" may be performed. That is, with respect to a partner whom the user has passed by for the first time, only the "common greeting" can be used. However, with respect to a partner the user has passed by two times or more, either one of the "common greeting" and the "individual greeting" can be selected to be used. The reason for this configuration is that, with respect to a partner whom the user has passed by two times or more (passing communications have been performed), the user will probably pass by the partner more times in the future, and thus, the user is allowed to perform a friendly greeting by using the "individual greeting".

In the initial setting of the plaza application, only creation of the "common greeting" is performed. In the embodiment, an input screen is displayed as appropriate, and the user inputs text of up to 16 characters. This text is stored as a "common greeting". As a result, the "common greeting" created and stored here can be selected in the "greeting process". It is assumed that only one "common greeting" can be created in the embodiment.

[Passing Communication in Sleep Mode]

After the initial setting of the plaza application is finished, the data regarding the user character, the text data of the "common greeting", and the like are stored in the transmission box. Then, the main screen of the plaza application is displayed.

The user ends the plaza application once, and sets the game apparatus 1 in the sleep mode. Then, the user goes out, carrying the game apparatus 1. After the passing communications described above are performed several times while the user is out, the user comes back.

When the user runs the plaza application after coming back, the following processes are performed as processes with respect to other user characters obtained through the passing communications (to be more specific, passing communications in which user characters are transmitted/received. Hereinafter, the passing communication denotes such a passing communication in which user characters are transmitted/received) which occurred while the user was out.

[New Arrival Notification]

Figure 5:
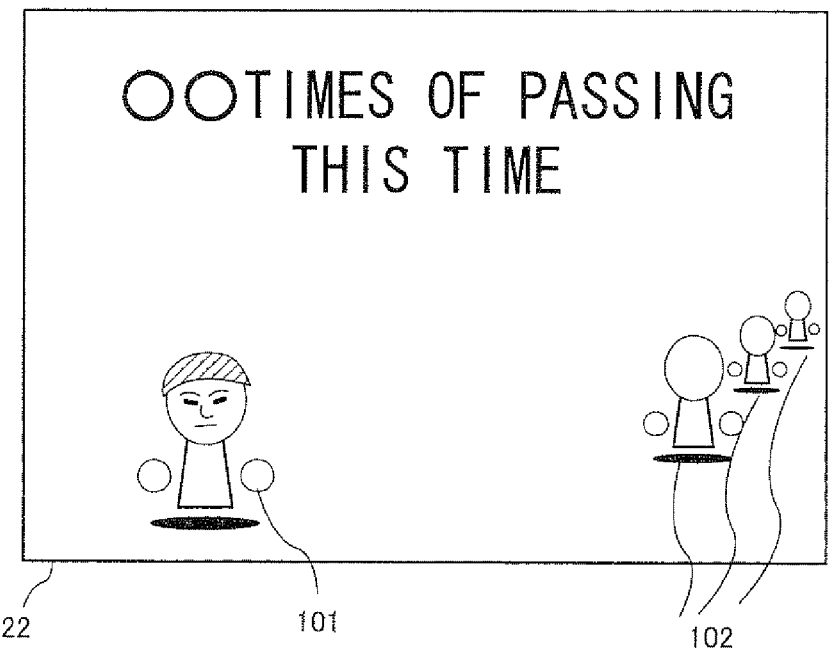
FIG. 5 is an example of a screen according to processing of the plaza application.
Figure 6:
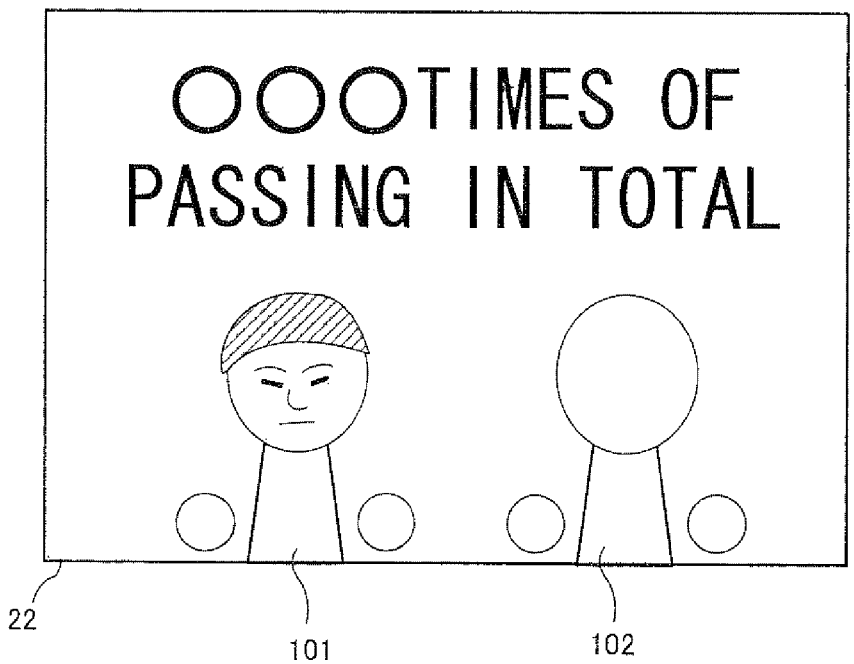
FIG. 6 is an example of a screen according to the processing of the plaza application.

First, a new arrival notification process is performed. Specifically, as shown in FIG. 5, the number of times of passing communications that occurred while the user was out is displayed. In FIG. 5, a user character 101 created by the user is displayed in a left part of the screen, and a line of other user characters 102 obtained through the passing communications is displayed in a right part of the screen. At the substantially center of the upper part of the screen, a message indicating the number of times of passing that occurred this time is displayed. Then, an animation is displayed of said other user characters 102 approaching and passing by the user character 101 one by one. Then, the total number of times of passing communications (in which user characters are transmitted/received) that have occurred is displayed as shown in FIG. 6.

After the display of the new arrival notification ends, then, the following processes are performed in order, for each of said other user characters 102.

(1) Self-introduction of partner's user character, (2) the greeting process, (3) recent-state report and the like of partner's user character, and (4) the evaluation process FIG. 7 to FIG. 21 show examples of the screens of these processes. For example, in FIG. 7, the user character 101 is displayed in a left part of the screen, and another user character 102, which has been obtained through the passing communication that occurred while the user was out this time, is displayed in a right part of the screen. Using the screen as a basic screen, the following processes are performed.

[(1) Self-Introduction of Partner's User Character]

Figure 7:
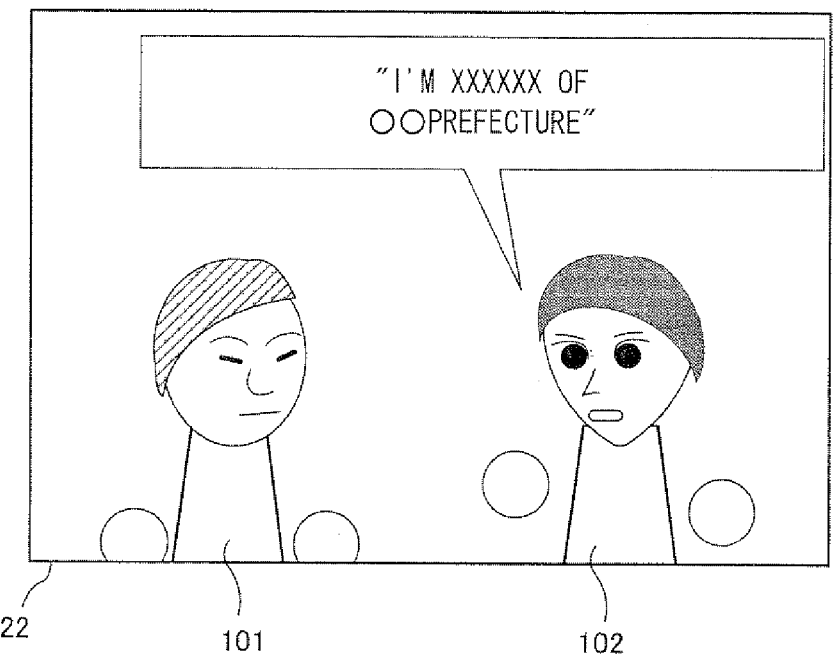
FIG. 7 is an example of a screen according to the processing of the plaza application.

First, (1) self-introduction of partner's user character is performed. In the embodiment, as shown in FIG. 7, the "region" where the other user lives and the "name" of the other user are displayed as the self-introduction. The "region" is a content stored as one of the settings of the game apparatus 1 which is the transmission source of the other user character. The "name" is a name that the creator of the other user character (that is, the other user) has assigned to the other user character. The display uses a balloon so that the other user character 102 appears as if it is talking.

Figure 8:
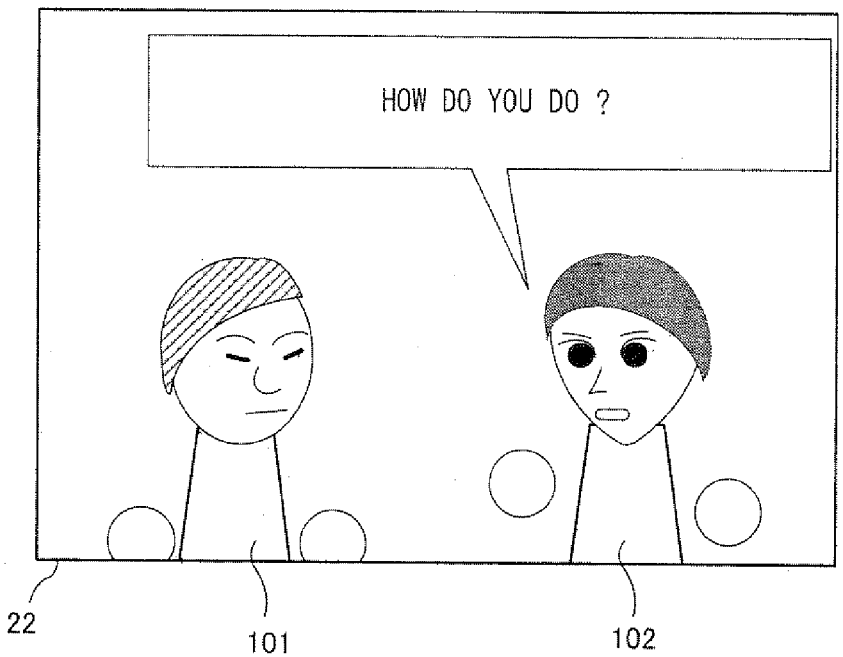
FIG. 8 is an example of a screen according to the processing of the plaza application.
Figure 9:
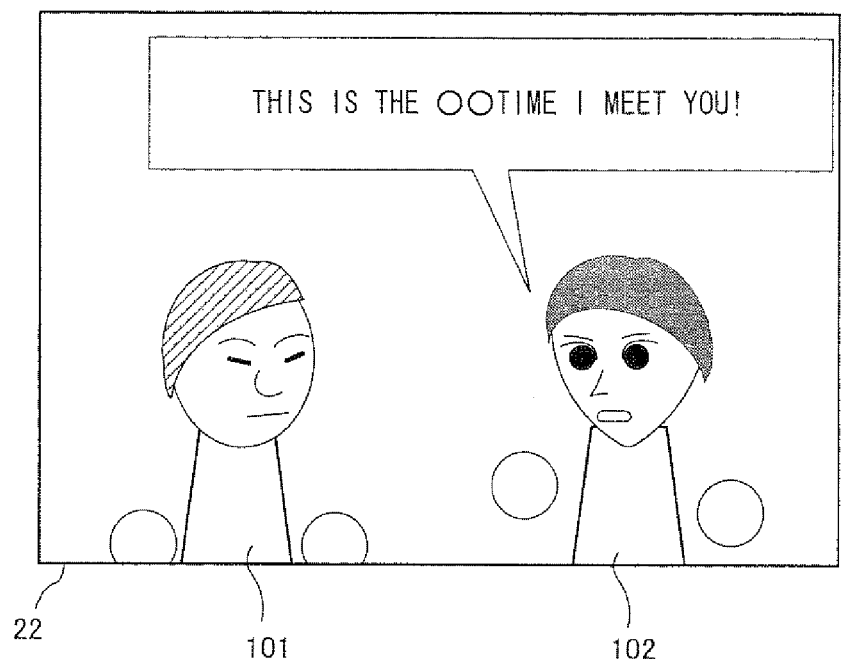
FIG. 9 is an example of a screen according to the processing of the plaza application.

After the self-introduction of partner's user character is finished, in a case where the other user character 102 is met for the first time, a message "How do you do?" as shown in FIG. 8 is displayed in a balloon. In a case where the other user character is the same one that has been obtained in a previous passing communication, a message indicating the number of times of passing is displayed as shown in FIG. 9.

[(2) Greeting Process]

Next, (2) the greeting process is performed. In this process, "greeting from the partner's user character to the user's user character" is performed, and then "greeting from the user's user character to the partner's user character" is performed. Hereinafter, a case where the other user character 102 is met for the first time, and a case where the other user character 102 has been met before will be described separately.

[Meeting for the First Time]

Figure 10:
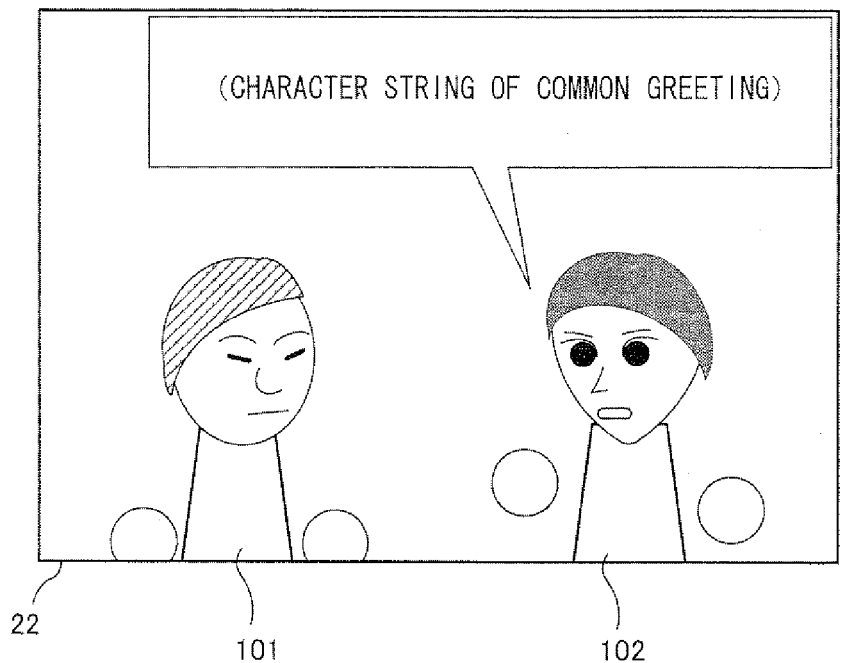
FIG. 10 is an example of a screen according to the processing of the plaza application.
Figure 11:
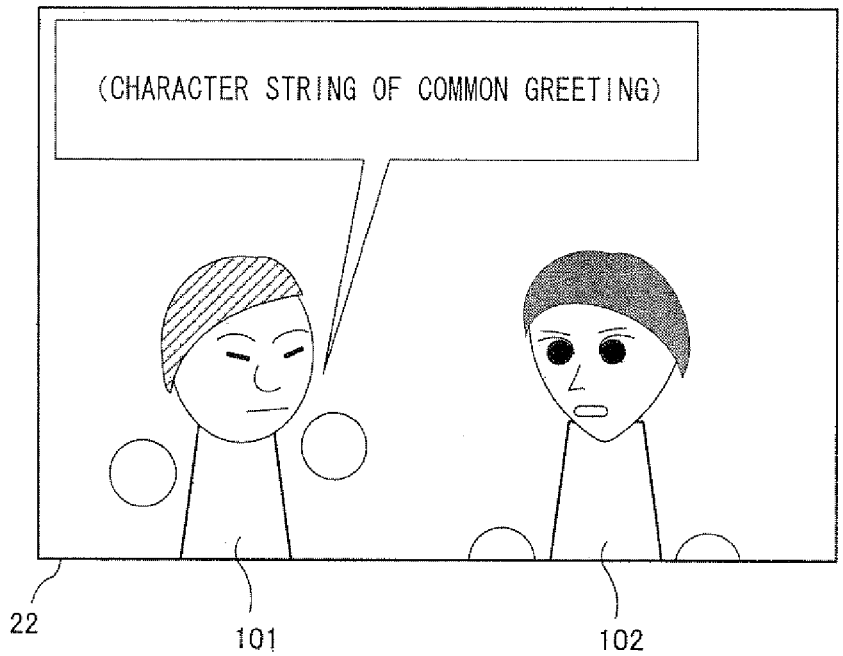
FIG. 11 is an example of a screen according to the processing of the plaza application.

In a case where the other user character 102 concerning the present process is met for the first time, first, the "common greeting" set by the partner is displayed as the "greeting from the partner's user character to the user's user character", in a manner as if the other user character 102 is talking, as shown in FIG. 10. Then, the "common greeting" set by the user is displayed as the "greeting from the user's user character to the partner's user character", in a manner as if the user character 101 is talking, as shown in FIG. 11. This is the text message of up to 16 characters created in the above initial setting.

[Meeting Second Time and Thereafter]

Figure 12:
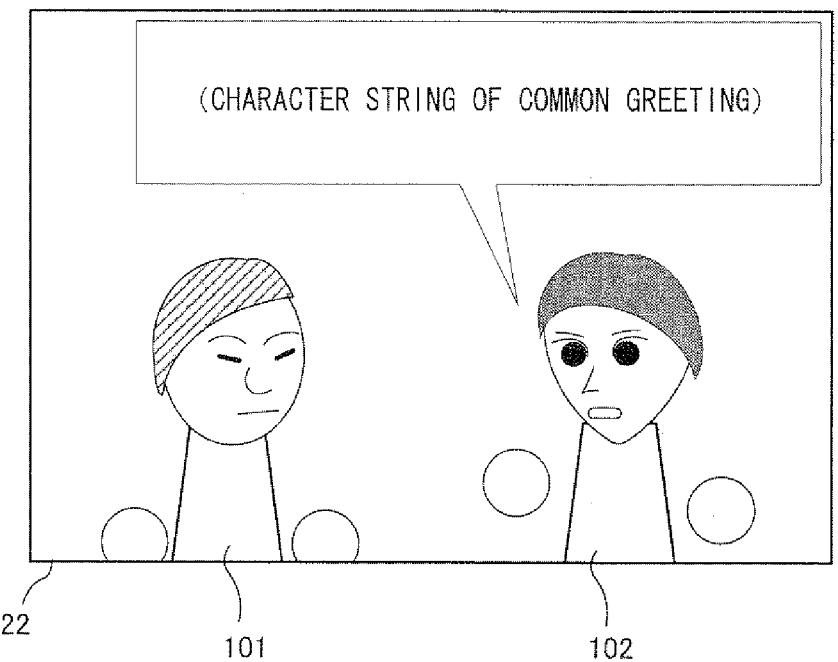
FIG. 12 is an example of a screen according to the processing of the plaza application.
Figure 13:
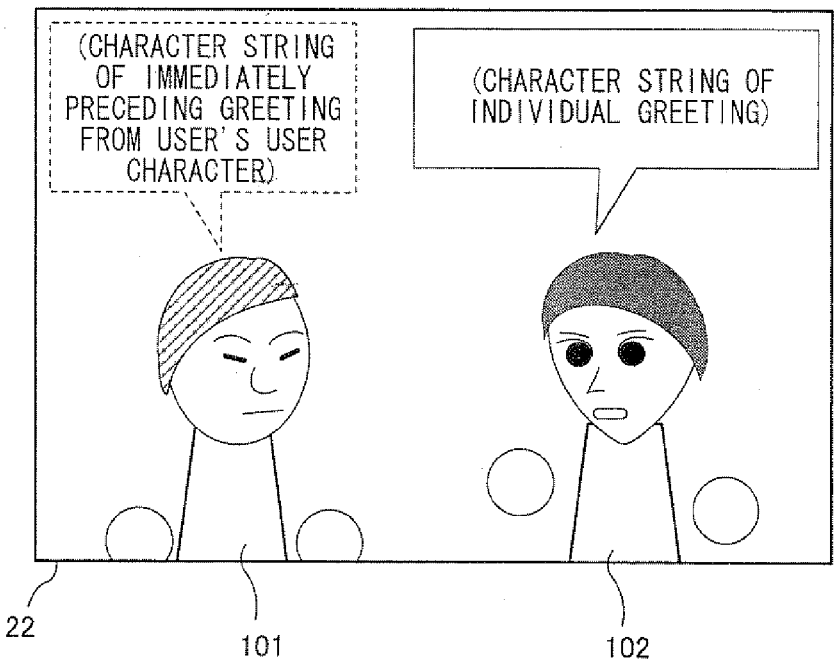
FIG. 13 is an example of a screen according to the processing of the plaza application.

In a case where the other user character 102 concerning the present process is not a user character met for the first time, the "common greeting" or the "individual greeting" set by the partner is displayed as the "greeting from the partner's user character to the user's user character", as shown in FIG. 12. Which of these is displayed depends on which greeting the partner has set. Here, in a case where the greeting from the partner's user character is the "individual greeting", the content of the greeting from the user's user character, based on which the "individual greeting" is created, is also displayed (see FIG. 13). Specifically, the content of the greeting from the user's user character is displayed first. Then, in response to the content of the greeting, the individual greeting from the partner's user character is displayed. This is intended to allow the user to easily understand to which of the user's greetings the "individual greeting" of the partner's user character (reply) is returned. At the same time, since the user's user character 101 and the partner's user character 102 are displayed in such a manner as if they are talking, the user has an enhanced feeling as if he or she is communicating with the partner.

Figure 14:
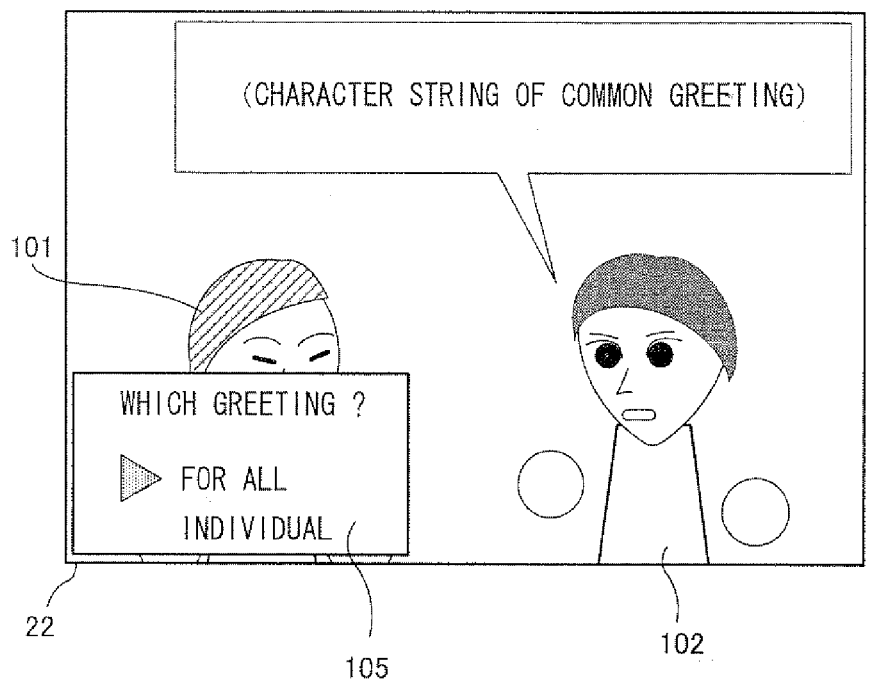
FIG. 14 is an example of a screen according to the processing of the plaza application.
Figure 15:
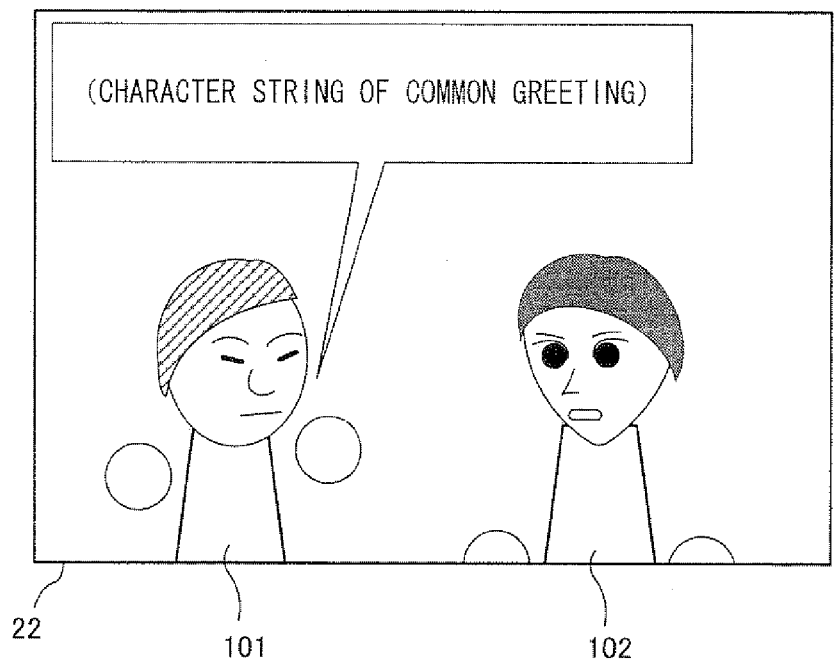
FIG. 15 is an example of a screen according to the processing of the plaza application.
Figure 16:
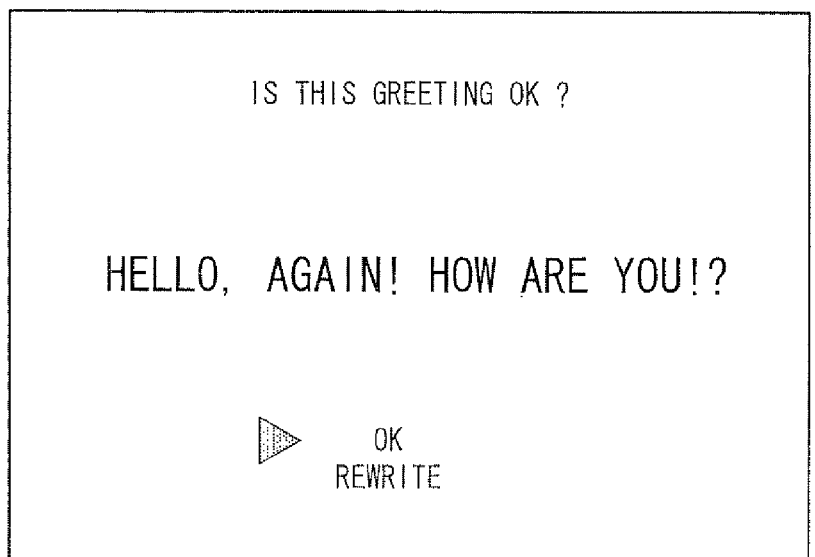
FIG. 16 is an example of a screen according to the processing of the plaza application.
Figure 17:
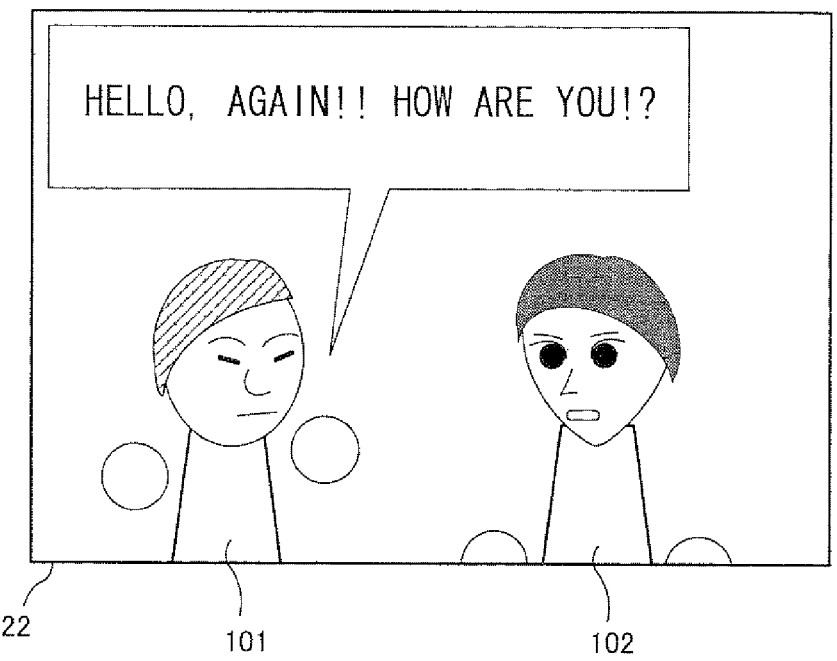
FIG. 17 is an example of a screen according to the processing of the plaza application.

Next, displayed is a greeting selection window 105 for selecting the type of greeting, as the "greeting from the user's user character to the partner's user character", as shown in FIG. 14. In FIG. 14, two options, "for all" and "individual", are displayed. When the user selects the "for all", it is considered that the common greeting is selected. As a result, as shown in FIG. 15, the "common greeting" created by the user is displayed. On the other hand, when the user selects the "individual", it is considered that the "individual greeting" is selected. As a result, a screen (not shown) for inputting text as the "individual greeting" is displayed first. The user inputs text of up to 16 characters (in 2-byte characters) on the screen, using a predetermined input device. After the input is finished, a confirmation screen as shown in FIG. 16 is displayed. If the user approves on the confirmation screen, the "individual greeting" that the user has just inputted is displayed as shown in FIG. 17. This is the end of the greeting process performed with respect to the other user character currently displayed.

The "individual greeting", as well as information for specifying the communication partner, is appropriately set as transmission data for the passing communication, and is stored in the transmission box. Then, the "individual greeting" is transmitted through the passing communication. It should be noted that, in the embodiment, basically, the transmission of "individual greeting" is performed to an unspecified number of partners. Then, a partner who has received the "individual greeting" determines whether the "individual greeting" is addressed to the partner himself/herself, and sorts it.

It should be noted that in a case where "not perform" is set in the setting item, "whether to perform greeting process", the greeting process shown in FIG. 10 to FIG. 17 is omitted.

[(3) Recent-State Report and the Like of Partner's User Character]

After the greeting process is finished, then, some messages indicating the recent-state report and the like of partner's user character are displayed. Although not shown, messages indicating, for example, a game that the partner's user character has played recently or the like are displayed. Further, messages indicating the profile of the partner's user character, such as hobbies and favorite foods, are also displayed.

[(4) Evaluation Process]

After the display of the messages indicating the recent-state report and the like of partner's user character is finished, then, the evaluation process is performed. Here, with respect to the evaluation process, as in the case of the individual greeting, the evaluation process is allowed only with respect to the partner with whom the passing communication has been performed two times or more. That is, the evaluation process is not performed with respect to a partner who is met for the first time. In a case where a partner is a person the user meets for the first time (a person the user passes by for the first time), the probability of meeting him or her again (passes by him or her) is unknown at that moment, and the probability of never meeting the person again is not low. On the other hand, in a case where the second passing communication has occurred with the same person, it is considered that the person and the user are in a relatively friendly relationship. Accordingly, it can be expected that the third passing communication and thereafter may occur. Therefore, the evaluation process is configured to be performed only with respect to a partner with whom the user is likely to pass by again, thereby reducing evaluation operations which may be performed to no avail.

Figure 18:
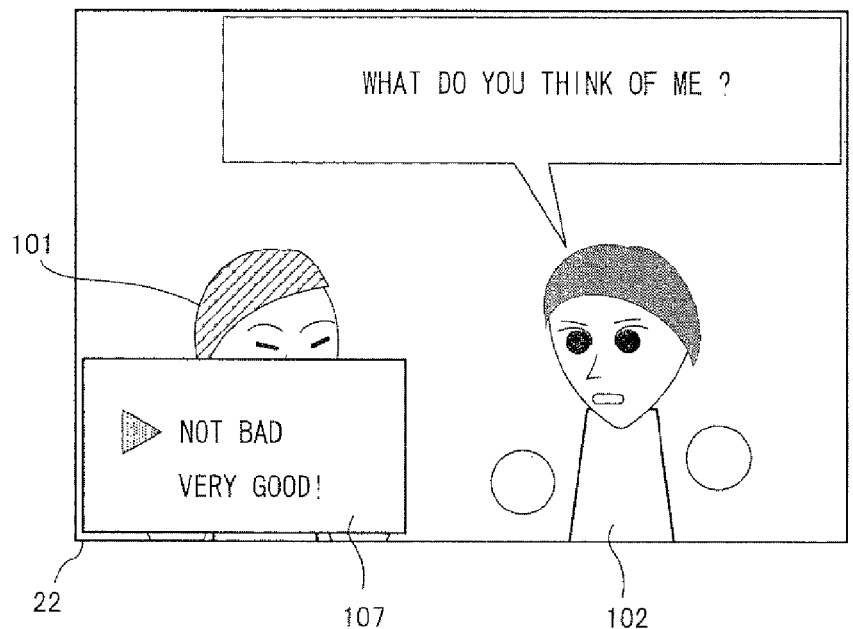
FIG. 18 is an example of a screen according to the processing of the plaza application.
Figure 19:
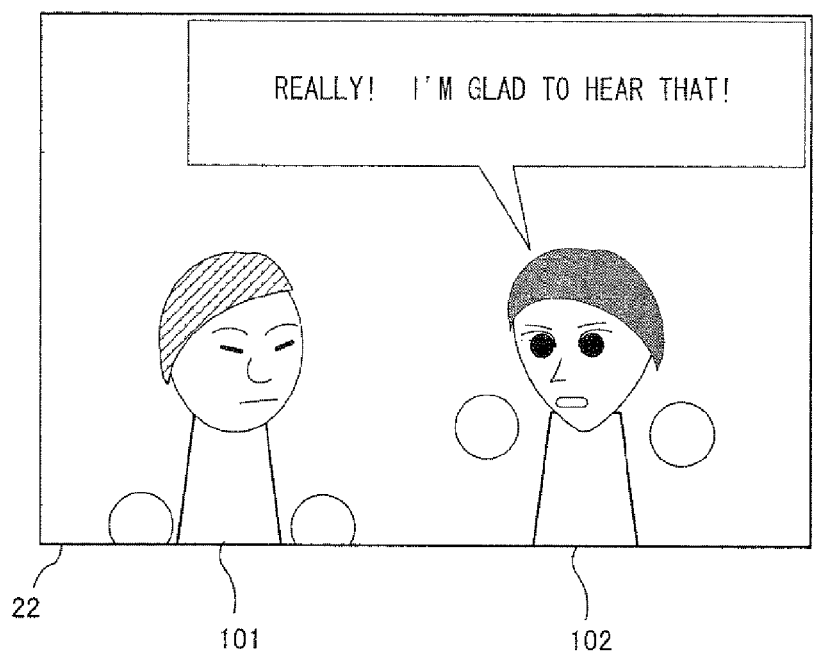
FIG. 19 is an example of a screen according to the processing of the plaza application.

First, a screen for selecting the user's evaluation of the appearance of the other user character is displayed, as shown in FIG. 18. In FIG. 18, two options, "not bad" and "very good!", are displayed in an evaluation selection window 107, along with an inquiring message from the other user character 102. Here, it is assumed that the message "very good!" is a high evaluation. The user selects one of these options. Then, a predetermined message corresponding to the selected option is displayed as if the other user character 102 is talking. For example, when the "very good!" is selected, a message indicating joy is displayed as shown in FIG. 19. It should be noted that, in the embodiment, as an evaluation method, the evaluation is performed by one of the two prestored messages being selected. However, the evaluation method is not limited thereto. The evaluation may be performed by the user inputting text.

In a case where the high evaluation option of the two options is selected, data indicating to the effect is set as one of the pieces of transmission data for the passing communication. Then, in a future passing communication, the data indicating that the high evaluation has been given will be transmitted to the partner along with other types of data. Then, on the partner's apparatus which is a receiving end, it is determined whether data indicating the high evaluation addressed to the partner's user character is contained. If such data is contained, the data is displayed as an "evaluation from the partner's user character to the user's user character" (in this case, actually, the partner means user, and the user means partner) as described below. That is, in the case of the high evaluation, the partner is notified of the fact that the high evaluation has been given (on the premise that the user passes by the same user again).

In principle, the evaluation process can be performed only once with respect to the same partner (user character). However, even with respect to the same partner, if the appearance of the user character is changed (the appearance can be edited by means of the user character creation application), evaluation can be performed again with respect to the edited appearance.

Figure 20:
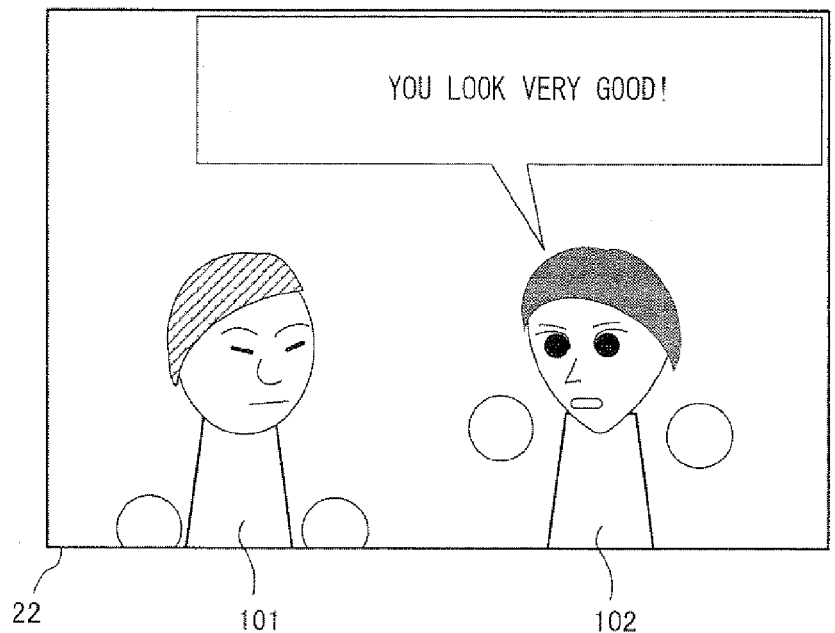
FIG. 20 is an example of a screen according to the processing of the plaza application.
Figure 21:
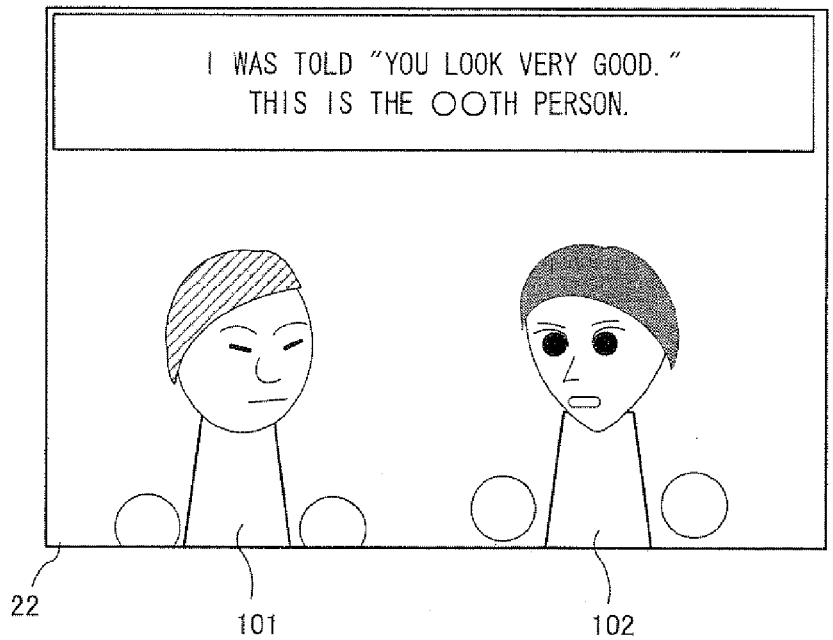
FIG. 21 is an example of a screen according to the processing of the plaza application.

After the evaluation from the user's user character to the partner's user character is finished, then, an evaluation from the partner's user character to the user's user character is displayed. This is displayed only when the partner has given the high evaluation to the user's user character. In this case, after a message indicating the evaluation from the partner's user character to the user's user character is displayed as shown in FIG. 20, then, the accumulating total number of times of receiving high evaluations up to the moment is displayed as shown in FIG. 21. On the other hand, in a case where the partner has not given a high evaluation to the user's user character (for example, the partner has selected "not bad" from the above options), the process regarding the evaluation from the partner's user character to the user's user character is not performed.

After a series of processes of (1) the self-introduction of partner's user character, (2) the greeting process, (3) the recent-state report and the like of partner's user character, and (4) the evaluation process as described above, is repeated by the number of times equivalent to the number of other user characters obtained through the passing communication, the main screen of the plaza application is displayed, and a main process of the plaza application is performed as appropriate. Since the main process is not directly relevant to the description of the embodiment, description thereof will be omitted.

As described above, in the embodiment, user characters can be collected by use of the "passing communication", which is a short-distance wireless communication, and in a case where the passing communication is performed with the same partner a plurality of times, a greeting for a specific partner, such as the above described "individual greeting", can be performed, considering that the partner and the user are in a friendly relationship. Further, evaluation is performed with respect to the user character created by the partner, and the evaluation result can be transmitted to the partner. Accordingly, simply by the user going out while carrying the game apparatus, the user can collect user characters through the above described passing communication. This eliminates the necessity of provision of a server and the like and thus realizes a relatively simple configuration which allows the user to have his or her own user character evaluated by other users and to receive the feedback. With respect to a partner the user passes by several times, an individual message can be transmitted to the partner in the form of the "individual greeting". Thus, it is possible to provide the user with a feeling as if the user is in close communication with the partner having the game apparatus 1.

Figure 22:
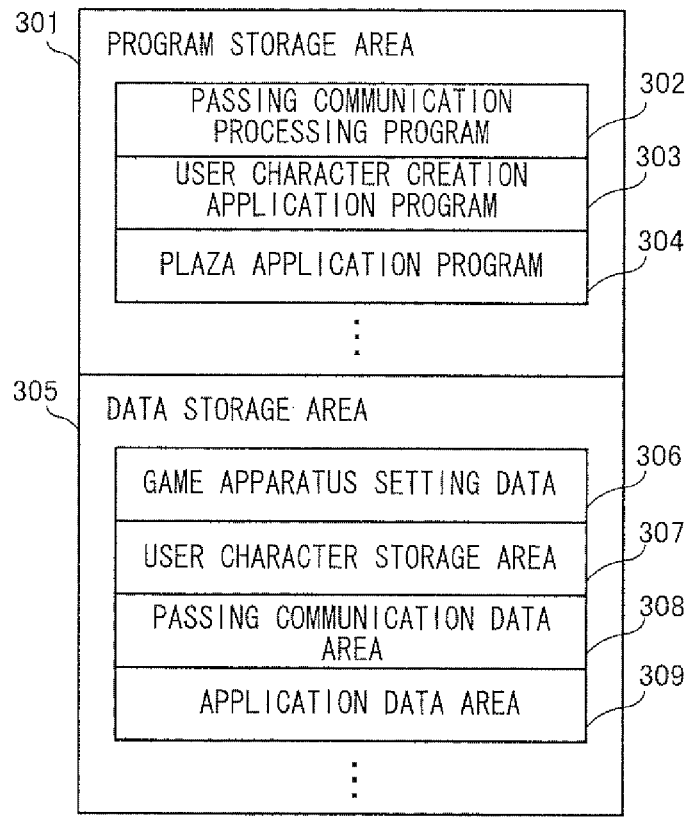
FIG. 22 is a diagram showing a memory map of a stored data memory 34 of the game apparatus 1.

Next, processes of the plaza application and the like performed by the game apparatus 1 will be described in detail. First, various types of data used in the processes will be described. FIG. 22 is a diagram showing a memory map of the stored data memory 34 of the game apparatus 1. With reference to FIG. 2, the stored data memory 34 includes a program storage area 301 and a data storage area 305. Data in the program storage area 301 and the data storage area 305 is transferred to the main memory 32 for use as appropriate, at the time of execution of the plaza application.

The program storage area 301 stores various programs to be executed by the CPU 31. In the embodiment, a passing communication processing program 302, a user character creation application program 303, the plaza application program 304 and the like are stored. The passing communication processing program 302 is a program for performing the passing communication in the sleep mode as described above. The user character creation application program 303 is a program for performing the user character creation application. The plaza application program 304 is a program for performing the plaza application.

The data storage area 305 stores game apparatus setting data 306 and the like. Moreover, the data storage area 305 includes a user character storage area 307, a passing communication data area 308, and an application data area 309.

Figure 23:
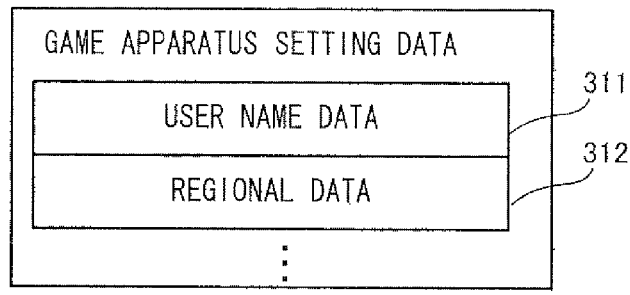
FIG. 23 is an example of a configuration of game apparatus setting data 306.

The game apparatus setting data 306 is mainly the setting data concerning the body of the game apparatus 1. FIG. 23 is an example of a configuration of the game apparatus setting data 306. The game apparatus setting data 306 includes a user name data 311, a regional data 312, and the like. The user name data 311 is data of the name of the owner (user) of the game apparatus 1. The user name data 311 also includes a user ID for uniquely identifying the user. The regional data 312 is data set by the user, and typically, is data indicating the region where the user lives. In addition, the game apparatus setting data 306 also includes information for connecting the game apparatus to the network, and the like.

Figure 24:
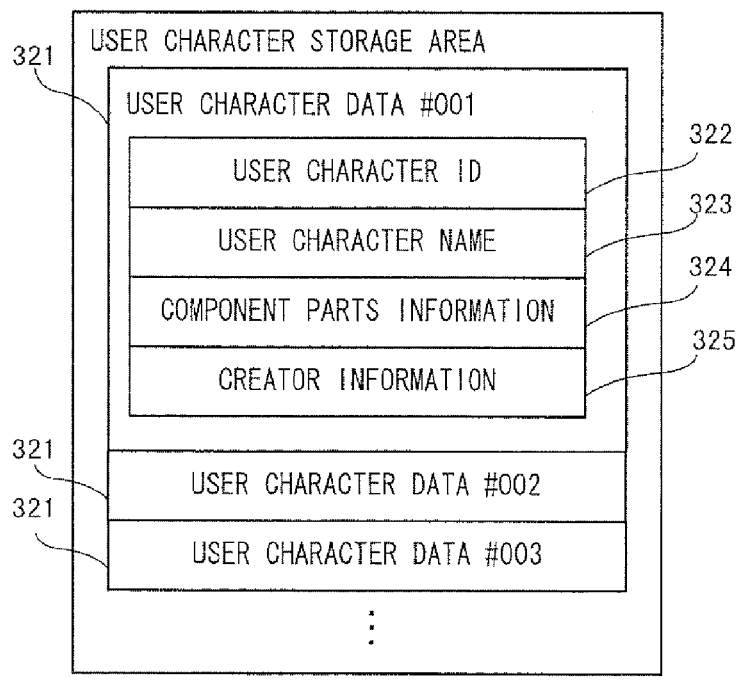
FIG. 24 is a diagram showing an example of a configuration of a user character storage area 307.

With reference back to FIG. 22, the user character storage area 307 is an area for storing user characters. FIG. 24 is a diagram showing an example of a configuration of the user character storage area 307. The user character storage area 307 is composed of pieces of user character data 321. This area stores data of a user character created by the user himself/herself, and also, data of user characters created by other user obtained through the passing communication. The data of the user characters stored in the area is data that can be used in various applications including the plaza application.

Each piece of the user character data 321 includes a user character ID 322, a user character name 323, a component parts information 324, a creator ID 325, and the like. The user character ID 322 is an ID for uniquely identifying a user character. In the embodiment, the user character ID 322 is created so as to be a unique ID in the whole world, by use of the number unique to the body of the game apparatus (for example, serial number) and the like. Specifically, the user character ID 322 is created by use of the number unique to the body of the game apparatus and the date and time when the user character is created.

The user character name 323 is a name set for a corresponding user character, and for example, character string data having a length of up to ten characters (in 2-byte characters).

The component parts information 324 is information indicating parts constituting the user character (as described above, a user character is composed of parts categorized in "eye", "nose", and the like).

The creator ID 325 is identification information of a person who created the user character. The creator ID 325 is created by use of the number unique to the body of the game apparatus. As a result, the creator ID 325 is identification information different from the game apparatus 1 to the game apparatus 1. In the case of a user character created by the user, the user name data 311 of the game apparatus setting data 306 is stored as the creator information ID 325. In the case of a user character created in another game apparatus, data indicating the user who created the user character (the user name data 311 of the other game apparatus 1) is the creator information ID 325.

Figure 25:
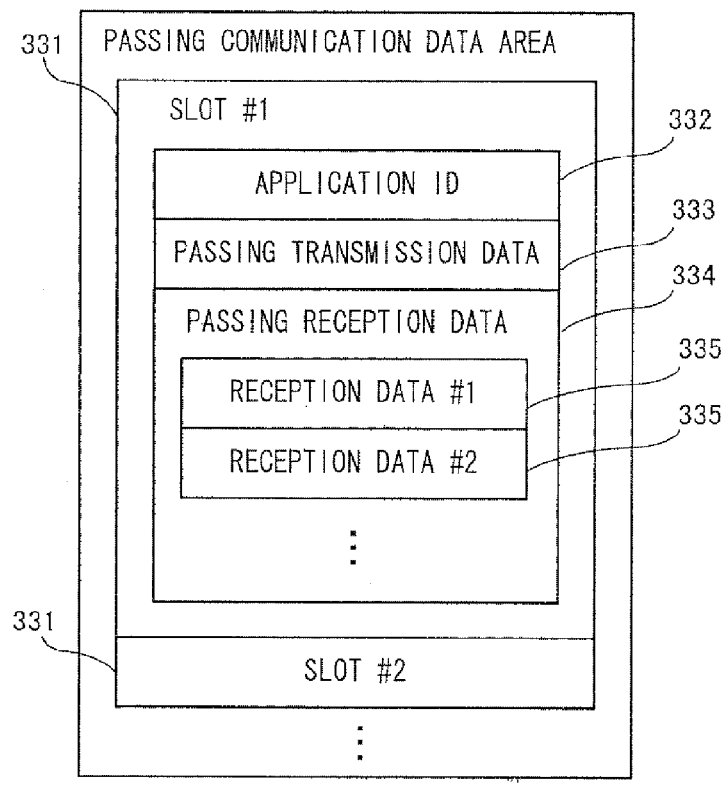
FIG. 25 is a diagram showing an example of a configuration of a passing communication data area 308.

With reference back to FIG. 22, the passing communication data area 308 is an area for storing various types of data used in the passing communication, as described with reference to FIG. 3 and FIG. 4. FIG. 25 is a diagram showing an example of a configuration of the passing communication data area 308. The passing communication data area 308 includes a plurality of slots 331 (16 slots in total in the embodiment). Each slot includes an application ID 332, passing transmission data 333, and passing reception data 334.

The application ID 332 is an ID for identifying an application that uses (is associated with) the slot.

Figure 26:
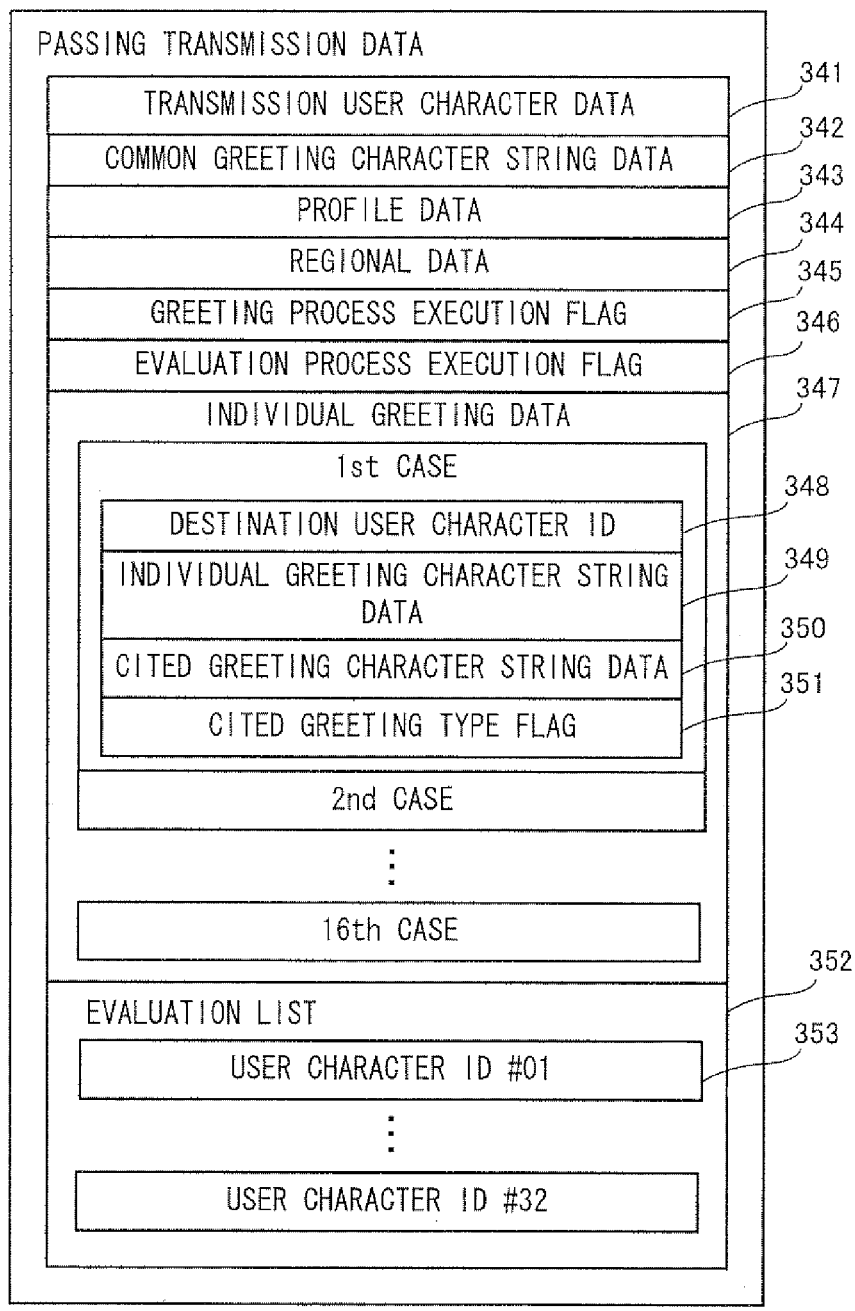
FIG. 26 is a diagram showing an example of a configuration of passing transmission data 333.

The passing transmission data 333 is data to be transmitted to other game apparatuses 1 in the passing communication. FIG. 26 is a diagram showing an example of a configuration of the passing transmission data 333. With reference to FIG. 26, the passing transmission data 333 includes transmission user character data 341, common greeting character string data 342, profile data 343, regional data 344, a greeting process execution flag 345, an evaluation process execution flag 346, individual greeting data 347, and an evaluation list 352.

The transmission user character data 341 is data of a user character to be transmitted in the passing communication. A piece of user character data 321, which corresponds to one user character, selected by the user from among the pieces of user character data 321 (or information for identifying the data) is stored as the transmission user character data 341.

The common greeting character string data 342 is character string data indicating the "common greeting" as described above.

The profile data 343 is data used in the "recent-state report and the like of partner's user character", which is performed after the greeting process, in the plaza application. The content of the profile data 343 is used when the "recent-state report and the like of partner's user character" is performed on another game apparatus 1 which has become the transmission destination in the passing communication.

The regional data 344 is copied data of the regional data 312 in the game apparatus setting data 306.

The greeting process execution flag 345 is a flag indicating whether to permit the greeting process as described above to be performed. When the flag is ON, it means that the greeting process is permitted to be performed. When the flag is OFF, it means that the greeting process is not permitted to be performed.

The evaluation process execution flag 346 is a flag indicating whether to permit the evaluation process as described above to be performed. When the flag is ON, it means that the evaluation process is permitted to be performed. When the flag is OFF, it means that the evaluation process is not permitted to be performed.

The individual greeting data 347 is data concerning the "individual greeting" as described above and stores data of most recent 16 "individual greetings". Data of one individual greeting includes a destination user character ID 348, individual greeting character string data 349, cited greeting character string data 350, and a cited greeting type flag 351.

The destination user character ID 348 is data for identifying the partner's user character to which the "individual greeting" has been performed, and corresponds to the user character ID 322.

The individual greeting character string data 349 is character string data indicating the content of the "individual greeting".

The cited greeting character string data 350 is the content of the greeting from the other user character at the time when the "individual greeting" is created. For example, a case is assumed in which in response to a "greeting", "Hello, again! How are you?" from the other user character, an "individual greeting", "I'm fine, thank you." is returned. In this case, the character string data "I'm fine, thank you." is stored in the individual greeting character string data 349, and the character string data, "Hello, again! How are you?", is stored in the cited greeting character string data 350.

The cited greeting type flag 351 is a flag indicating whether the type of greeting, from the other user character, to be stored as the cited greeting character string data 350 is the "common greeting" or the "individual greeting". For example, the value "0" means that the greeting is the "common greeting", and the value "1" means that the greeting is the "individual greeting".

The individual greeting data 347 stores up to 16 pieces of data of the individual greeting, each piece including the above described data. In a case where a new piece of data of an individual greeting is to be stored but 16 pieces of such data have already been stored, the oldest piece is deleted, and then the new piece is stored.

The evaluation list 352 is data indicating user characters with respect to which the user who created the passing transmission data (that is, person who transmits the data) has given a high evaluation. Up to most recent 32 user character IDs 353 of the user characters to which the user has given a high evaluation are stored.

With reference back to FIG. 25, the passing reception data 334 is data received from another game apparatus 1 in the passing communication. A plurality of pieces of reception data 335, each piece having the same configuration as that of the passing transmission data 333, are stored here. Therefore, description of the reception data 335 will be omitted.

Since the passing transmission data 333 and the reception data 335 has the same configuration, data contained in the passing transmission data 333 and data contained in the reception data 335 are distinguished by adding "S" or "R" to the end of their reference numerals of these types of data, respectively. For example, "transmission user character data 341S" denotes that the data is the transmission user character data 341 contained in the passing transmission data 333, and "transmission user character data 341R" denotes that the data is the transmission user character data 341 contained in the reception data 335. Also with respect to other types of data, if "R" is attached to the end of its reference numeral, it means that the data is contained in the reception data 335 (that is, the data is contained in the data received through the passing communication).

Figure 27:
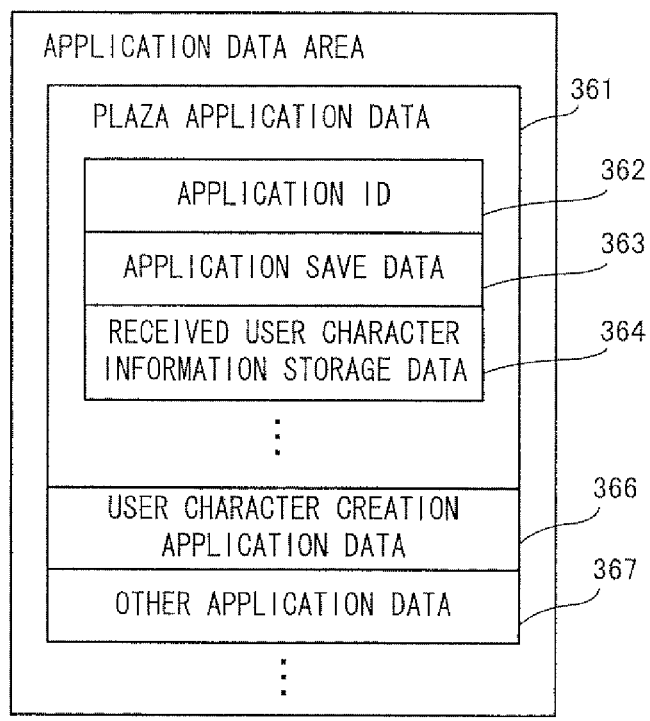
FIG. 27 is a diagram showing an example of a configuration of an application data area 309.

With reference back to FIG. 22, the application data area 309 is an area for storing data used in various applications performed by the game apparatus 1. FIG. 27 is a diagram showing an example of a configuration of the application data area 309. The area stores various types of data, each of which is logically divided for a corresponding application and is used in the corresponding application. In the example of FIG. 27, plaza application data 361, user character creation application data 366, and other application data 367 are shown. Here, the content of the plaza application data 361 will be mainly described.

The plaza application data 361 includes an application ID 362, application save data 363, received user character information storage data 364, and the like.

The application ID 362 is an ID for identifying the "plaza application". It is used for associating the application with a slot used in the passing communication as described above.

Figure 28:
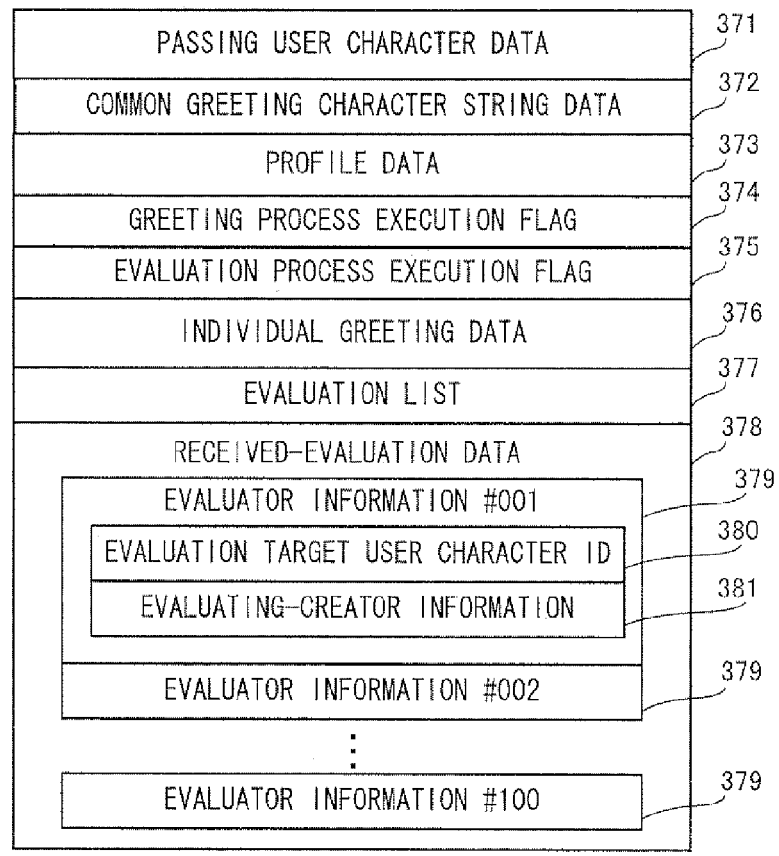
FIG. 28 is a diagram showing an example of a configuration of application save data 363.

The application save data 363 is data of various settings concerning the plaza application that have been made. FIG. 28 is a diagram showing an example of a configuration of the application save data 363. In FIG. 28, the application save data 363 includes passing user character data 371, common greeting character string data 372, profile data 373, a greeting process execution flag 374, an evaluation process execution flag 375, individual greeting data 376, an evaluation list 377, and received-evaluation data 378. Although not shown, the application save data 363 also includes a setting of whether to use the passing communication (that is, whether to perform the passing communication) with respect to the plaza application, and data such as the accumulating total number of passing communications.

The passing user character data 371 is data of a user character set to be transmitted in the passing communication.

The common greeting character string data 372 is character string data indicating the "common greeting" as described above.

The profile data 373 is data used in the "recent-state report and the like of partner's user character" as described above.

The greeting process execution flag 374 is a flag indicating whether to permit the greeting process as described above to be performed. The evaluation process execution flag 375 is a flag indicating whether to permit the evaluation process as described above to be performed. The function is the same as that of the greeting process execution flag 345 and of the evaluation process execution flag 346 in the passing transmission data 333.

The individual greeting data 376 is data of most recent 16 "individual greetings". The configuration is the same as that of the individual greeting data 347 in the passing transmission data 333.

The evaluation list 377 is a list of user character IDs of other user characters to which the user have given a high evaluation, and stores up to most recent 32 user character ID. The configuration is the same as that of the evaluation list 352 in the passing transmission data 333.

The received-evaluation data 378 is data of other users who have given a high evaluation to the user character created by the user. In the embodiment, up to 100 pieces of evaluator information 379 are stored therein. Each piece of evaluator information 379 includes evaluation target user character ID 380 and evaluating-creator information 381. The evaluation target user character ID 380 is an ID of a user character which was created by the user (the user character has become the target of the evaluation) and has obtained a high evaluation. The evaluating-creator information 381 is information indicating another user who has given the high evaluation, and creator information ID 325R received from the game apparatus 1 of the other user is stored as the evaluating-creator information 381. For example, it is assumed that a user A has created two user characters A and B. Then, a case is assumed in which the two user characters A and B are changed as appropriate to be used in the passing communication, and transmission is performed to a game apparatus of a user B and a game apparatus of a user C. Then, it is assumed that the user character A has obtained a high evaluation from the users B and C, but the user character B has obtained a high evaluation only from the user C. In this case, the received-evaluation data 378 is composed of three pieces of information, that is, <user character A's ID+user B's creator information>, <user character A's ID+user C's creator information>, and <user character B's ID+user C's creator information>.

Figure 29:
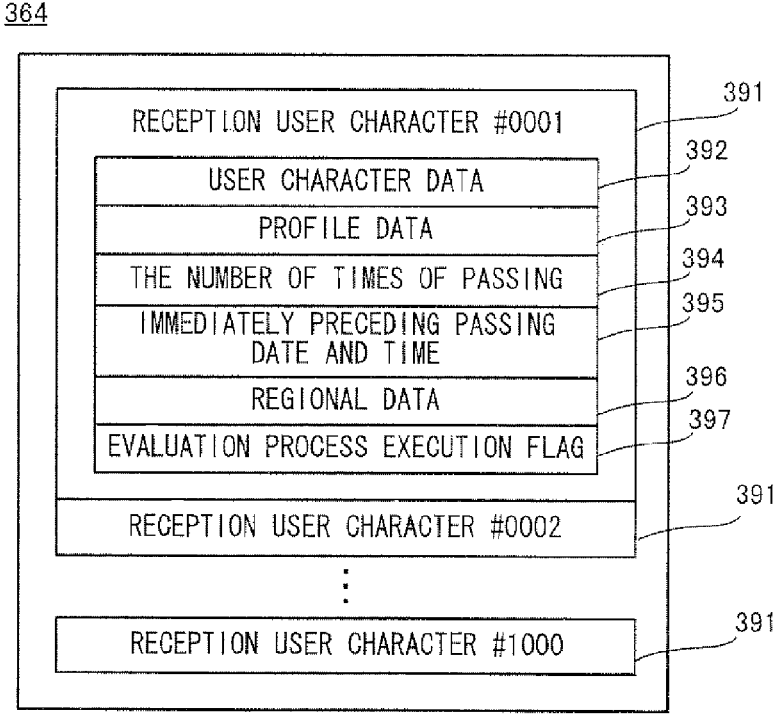
FIG. 29 is a diagram showing an example of a configuration of received user character information storage data 364.

With reference back to FIG. 27, the received user character information storage data 364 is data concerning a user character which has been received from another game apparatus 1 through the passing communication. FIG. 29 is a diagram showing an example of a configuration of the received user character information storage data 364. In FIG. 29, the received user character information storage data 364 stores 1000 reception user characters 391, Each reception user character 391 includes user character data 392, profile data 393, the number of times of passing 394, immediately preceding passing date and time 395, regional data 396, and an evaluation process execution flag 397.

The user character data 392 is copied data of the transmission user character data 341R contained in the reception data 335. Similarly, the profile data 393 is copied data of the profile data 343R contained in the reception data 335.

The number of times of passing 394 is data indicating the number of times of passing communications as described above performed with the game apparatus 1 which is the transmission source of the received user character. The immediately preceding passing date and time 395 is data indicating the date and time at which the passing communication with the game apparatus 1 of the transmission source of the received user character was performed last time. The regional data 396 is copied data of the regional data 344R contained in the reception data 335.

The evaluation process execution flag 397 is copied data of the evaluation process execution flag 346R contained in the reception data 335. That is, the evaluation process execution flag 397 is a flag indicating whether the creator of the received user character desires the character to be evaluated.

Hereinafter, operations of the processing of the plaza application performed by the game apparatus 1 will be described in detail. Before the detailed description of the operations of the plaza application is given, a specific flow of the processing concerning the above described passing communication will be briefly described.

Figure 30:
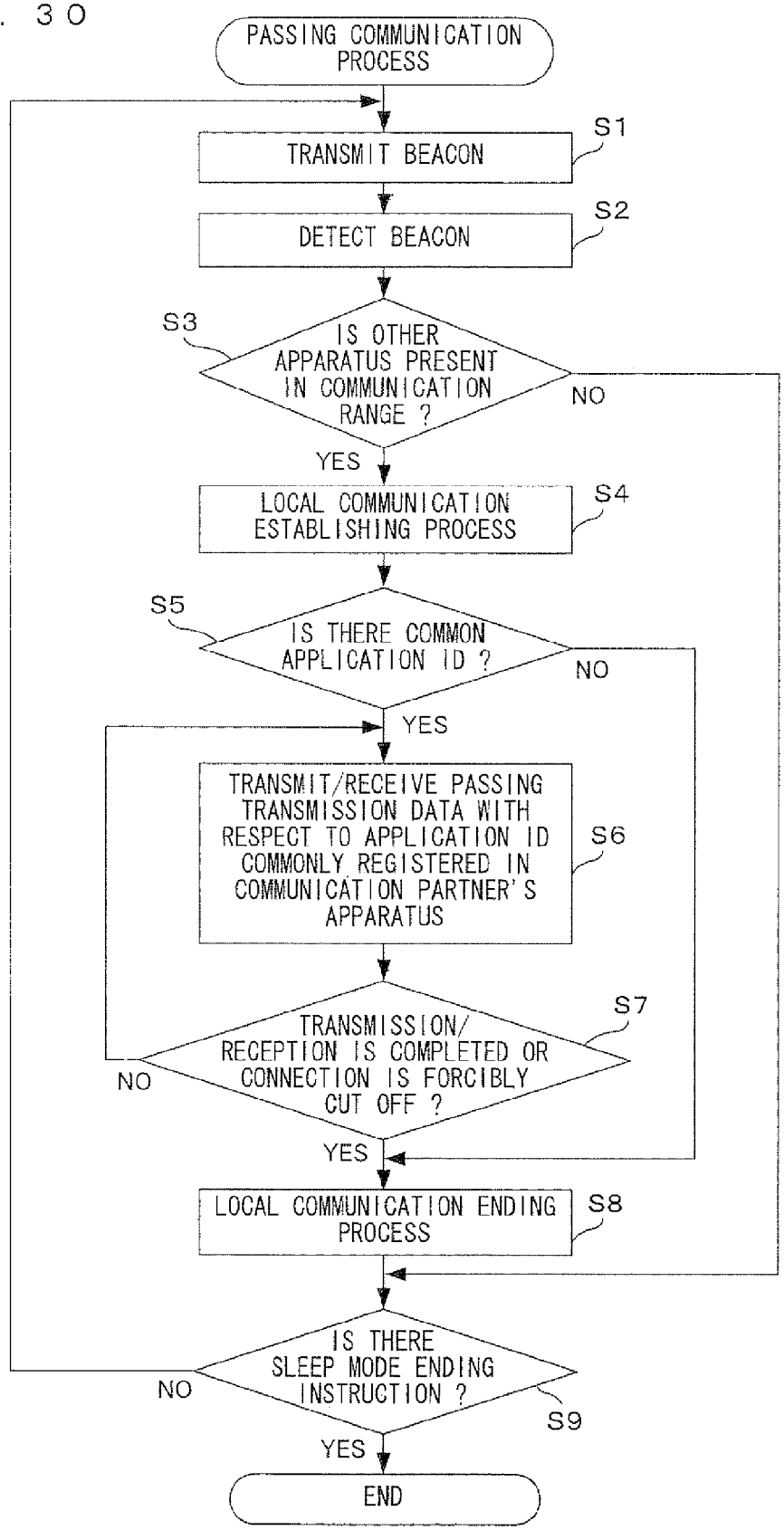
FIG. 30 is a flow chart showing in detail processing of the passing communication.

FIG. 30 is a flow chart showing in detail processing of the passing communication according to the embodiment. The processing according to the flow is performed while the game apparatus 1 is set in the "sleep mode" (passing communication mode). First, in step S1, a beacon signal is transmitted. The beacon signal contains information which triggers establishment of local communication between game apparatuses. Then, in step S2, the presence of a beacon transmitted by another game apparatus is detected.

Next, in step S3, it is determined whether a beacon has been detected as a result of detection of the beacon, that is, whether another game apparatus 1 is present in a communicable range of the user's own game apparatus 1 (hereinafter simply referred to as own game apparatus 1). As a result, if no another game apparatus 1 is present in the communicable range of the own game apparatus 1 (NO in step S3), the processing is advanced to step S9 described below. On the other hand, if another game apparatus 1 is present in the communicable range of the own game apparatus 1 (YES in step S3), a process for establishing local communication is performed in step S4. When the local communication is established, it is determined, in step S5, whether slots 331 having an identical application ID 332 are present in the own game apparatus 1 and the other game apparatus 1 which has become a communication partner, respectively. In other words, it is determined whether there is data to be transmitted/received in the passing communication. As a result, if there are no slots 331 having an identical application ID 332 (NO in step S5), the processing is advanced to step S8 described below. On the other hand, if there are slots 331 having an identical application ID 332, (YES in step S5), passing transmission data 333 concerning the slot 331 is transmitted to the other game apparatus 1 in step S6. At the same time, passing transmission data 333 transmitted from the other game apparatus 1 is stored as the reception data 335 in the passing reception data 334.

Next, in step S7, it is determined whether the transmission/reception of the data has been completed, or whether the local communication is forcibly disconnected (a case where the user has moved out of the communicable range before the passing communication is completed, and the like). As a result, if the transmission/reception of the data has not been completed and the local communication is not disconnected (NO in step S7), the processing returns to step S6, and the transmission/reception of the data is continued. On the other hand, if the transmission/reception is completed or the local communication is forcibly disconnected (YES in step S7), a process for ending the local communication is performed in step S8. In a case where the transmission/reception of the data has been completed, a process for "normally ending" the passing communication is performed by disconnecting the communication. In a case where the local communication has been forcibly disconnected before the transmission/reception is completed, a process for clearing data that has been received by that time and for returning the state to the state where the passing communication was started is performed.

Next, in step S9, it is determined whether an instruction for ending the "sleep mode" has been given, and if there is no such ending instruction has been given (NO in step S9), the processing returns to step S1 to be repeated. On the other hand, if the ending instruction has been given (YES in step S9), the passing communication process is ended. Thereafter, the following processing is performed by the game apparatus 1 operating in the "normal mode".

Next, the processing of the plaza application performed by the game apparatus 1 will be described in detail. The processing is started by the user issuing an instruction of executing the plaza application via the home menu of the game apparatus 1. For example, the processing is stated when the user selects an icon image corresponding to the plaza application from the home menu and presses a predetermined button.

Figure 31:
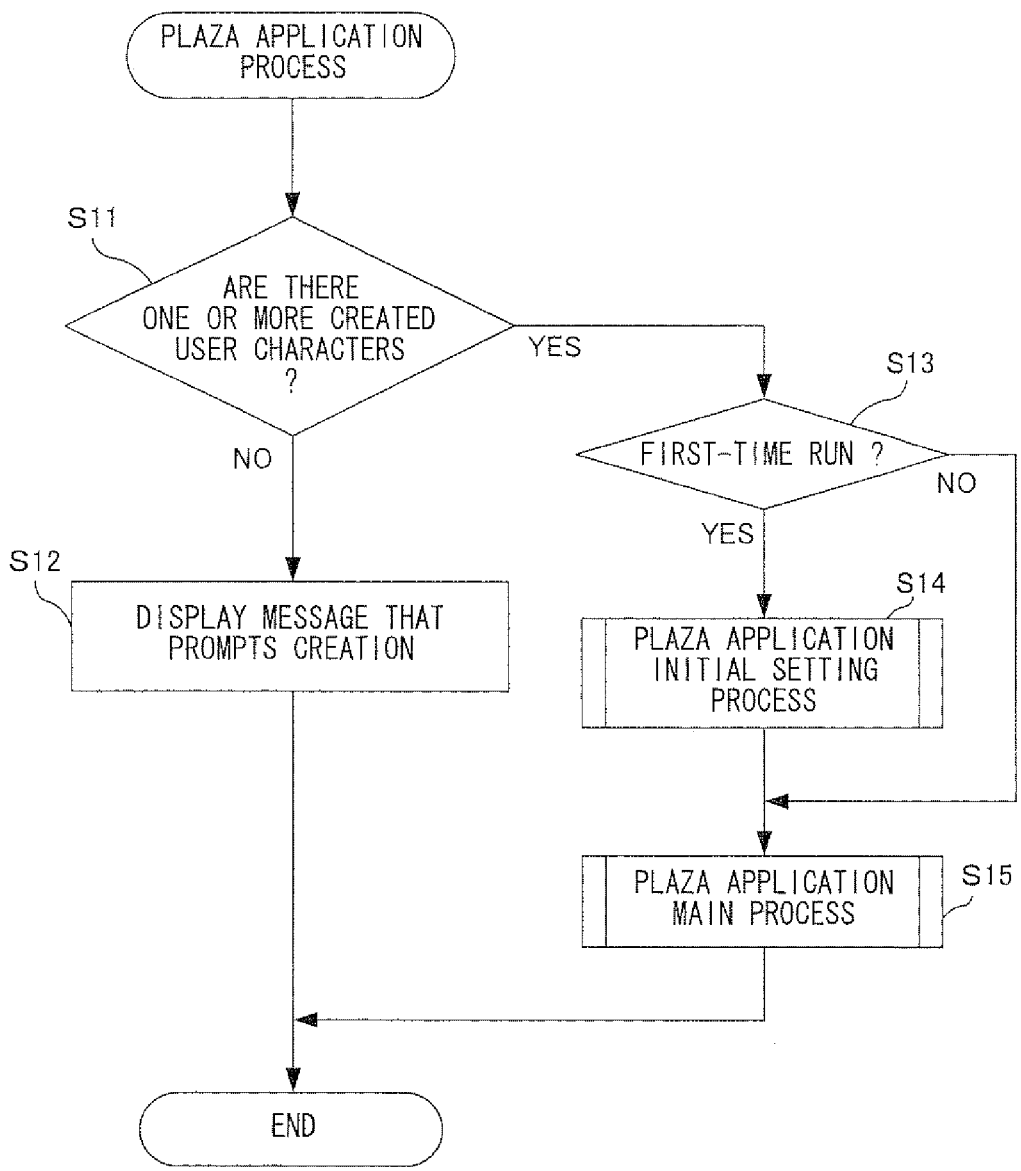
FIG. 31 is a flow chart showing in detail processing of the plaza application.

FIG. 31 is a flow chart showing in detail processing of the plaza application. First, with reference to FIG. 31, when the plaza application is started, an initial process such as loading of necessary files from the stored data memory 34 to the main memory 32 is performed as appropriate. Then, in step S11, the user character storage area 307 is referred to, and it is determined whether there are one or more user characters 101 that have been created. As a result of the determination, if there is no user character 101 that has been created (NO in step S11), a message that prompts the user to create a user character is displayed in step S12. Then, the plaza application process ends. That is, in a state where no user character has been created, the plaza application cannot substantially be used.

On the other hand, when one or more user characters 101 have been crated (YES in step S11), then, in step S13, it is determined the plaza application is run for the first time (that is, the plaza application has never been executed before). As a result, if the plaza application is run for the first time (YES in step S13), the plaza application initial setting process is performed in step S14. This process is a process for making various settings necessary to use the plaza application, such as selection of a user character to be used in the passing communication. On the other hand, if the plaza application is not run for the first time, (NO in step S13), the plaza application initial setting process is skipped, and the processing is advanced to step S15 described below.

Figure 32:
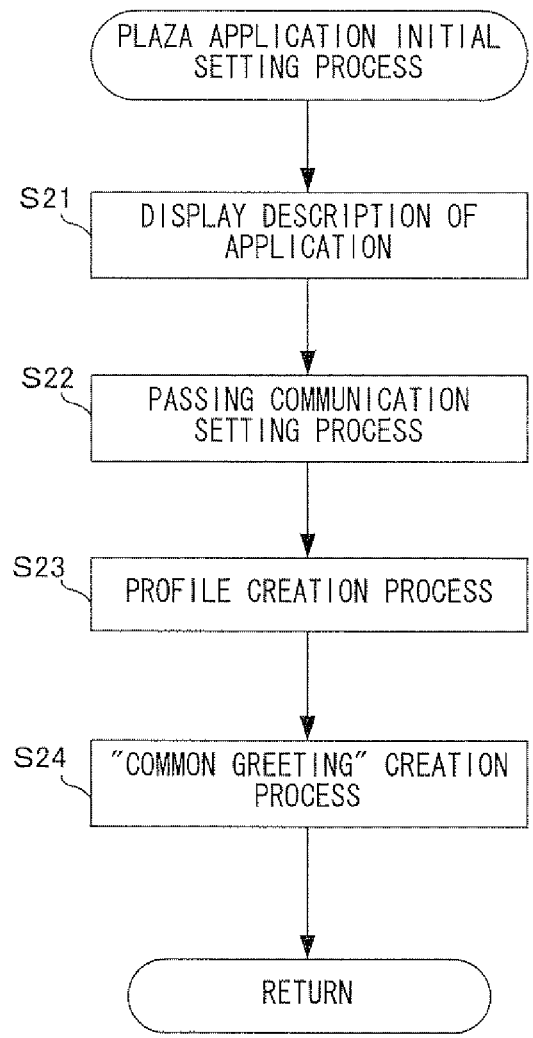
FIG. 32 is a flow chart showing in detail a plaza application initial setting process shown in step S14 in FIG. 31.

FIG. 32 is a flow chart showing in detail the plaza application initial setting process mentioned in step S14. First, with reference to FIG. 32, a brief introduction and description of the plaza application is displayed in step S21. In step S22, a process of making settings concerning the passing communication is performed in a form of dialog with the user. Specifically, whether to perform the "passing communication", whether to perform the "greeting process", whether to perform the "evaluation process", and the like are set by use of the dialogues. As a result, in accordance with the content of the input by the user, a process for associating one of the slots 331 in the passing communication data area 308 with the plaza application is performed. Further, a user character to be used in the passing communication is selected from the user character storage area 307, based on the content of the input by the user, and stored as the passing user character data 371 in the application save data 363. Further, the greeting process execution flag 374 and the evaluation process execution flag 375 in the application save data 363 are also set as appropriate in accordance with the content of the input by the user.

Next, in step S23, questions, based on which the profile data 373 is created, are displayed as appropriate, and the profile data 373 is set as appropriate in accordance with the content of the input by the user in response to the questions.

Next, in step S24, a process for creating a "common greeting" is performed. Specifically, a screen for inputting a character string as the "common greeting" is displayed. Then, a character string inputted by the user is stored as the common greeting character string data 372. Then, the plaza application initial setting process ends.

Figure 33:
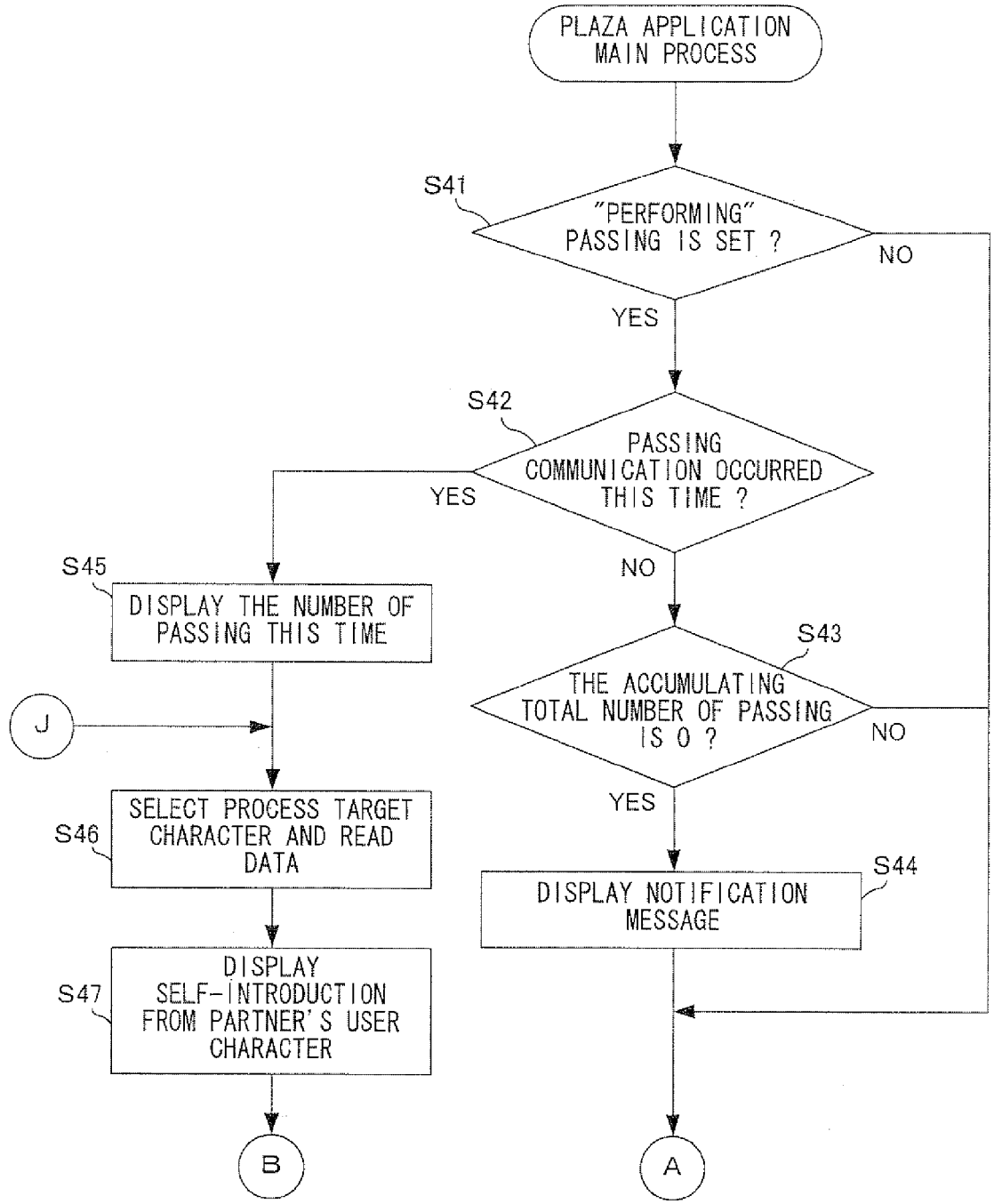
FIG. 33 is a flow chart showing in detail a plaza application main process.

With reference back to FIG. 31, next, in step S15, the plaza application main process is performed. Each of FIG. 33 to FIG. 38 shows in detail a flow chart of the plaza application main process. With reference to FIG. 33, first, in step S41, the application save data 363 is referred to, and it is determined whether "performing" the passing communication by means of the plaza application has been set. As a result, if "not performing" the passing communication has been set (NO in step S41), the processing is advanced to step S80 described below, and the main screen of the plaza application is displayed.

On the other hand, if "performing" the passing communication has been set (YES in step S41), then, in step S42, the passing communication data area 308 is referred to, and it is determined whether a passing communication has occurred while the sleep mode has been set this time (that is, most-recently-set sleep mode). For example, the determination is made by determining whether the content of the passing reception data 334 is empty. As a result of the determination, if no passing communication has occurred (NO in step S42), then, in step S43, the application save data 363 is referred to, and the accumulating total number of times of passing communications is 0. As a result, if the number of times of passing communications is 0 (NO in step S43), it is considered that no other user character has been received. Therefore, in step S44, a message for encouraging the user to perform the passing communication (for example, "Let's go to a place where many people gather and try passing communication!"). Then, the processing is advanced to step S80 described below.

Meanwhile, if a passing communication has occurred while the most recent sleep mode has been set (YES in step S42), it can be considered that at least one other user character has been received, and thus, a process concerning the new arrival notification is performed. Specifically, in step S45, the number of times of passing in the current passing communication (the number of other user characters that have been received) is displayed by use of a screen as described with reference to FIG. 5. Then, the displayed number of times is added to the data indicating the accumulating total number of times of passing (not shown), and a screen as shown in FIG. 6 is created and displayed. Moreover, the accumulating total number of times of passing obtained after the addition is stored as a part of the application save data 363.

After the process concerning to the new arrival notification ends, then, a process concerning each user character that has been received is performed. First, in step S46, the passing reception data 334 is referred to, and one user character to be processed (the reception data 335) is selected in chronological order and read. Hereinafter, the selected user character is referred to as a process target character.

Next, in step S47, a process of displaying a self-introduction of the process target character is performed. Specifically, the transmission user character data 341R in the reception data 335 (the configuration is the same as that of the passing transmission data 333 shown in FIG. 26) is referred to, and the user character name 323R contained therein is obtained. Further, by the regional data 344R in the reception data 335 being referred to, the name of the region is also obtained. Then, based on these pieces of data, a self-introduction screen (see FIG. 7) displaying the region and the name is created and displayed.

Figure 34:
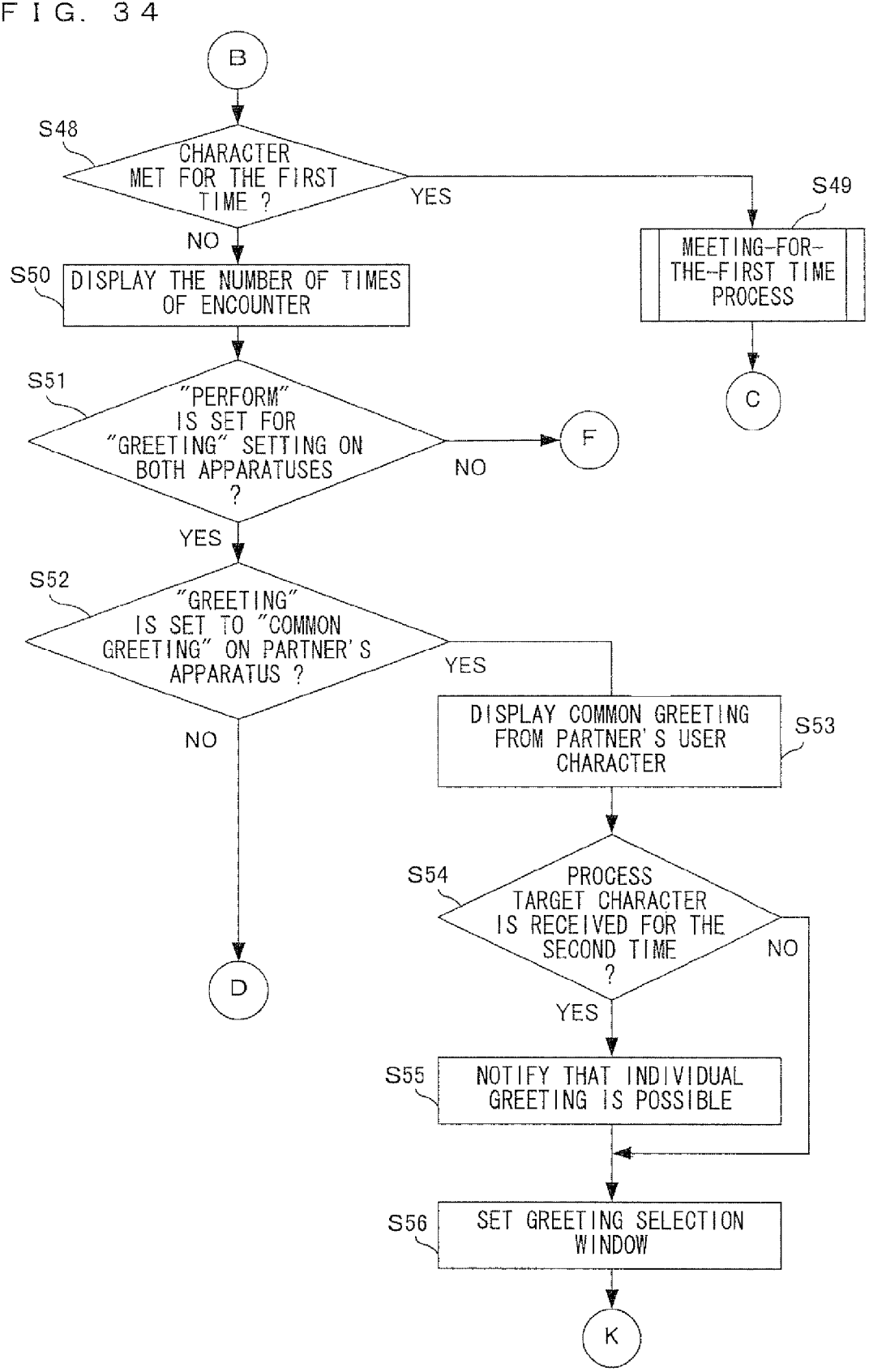
FIG. 34 is a flow chart showing in detail the plaza application main process.

Next, in step S48 in FIG. 34, it is determined whether the process target character is a user character "met for the first time". Whether the user character is "met for the first time" is determined, for example, in the following manner: the received user character information storage data is searched for the user character ID 322R of the process target character, and if the user character ID 322 R is found, it is determined that the user character is not "met for the first time" (if the user character ID 322 R is not found, it is determined that the user character is "met for the first time").

Figure 35:
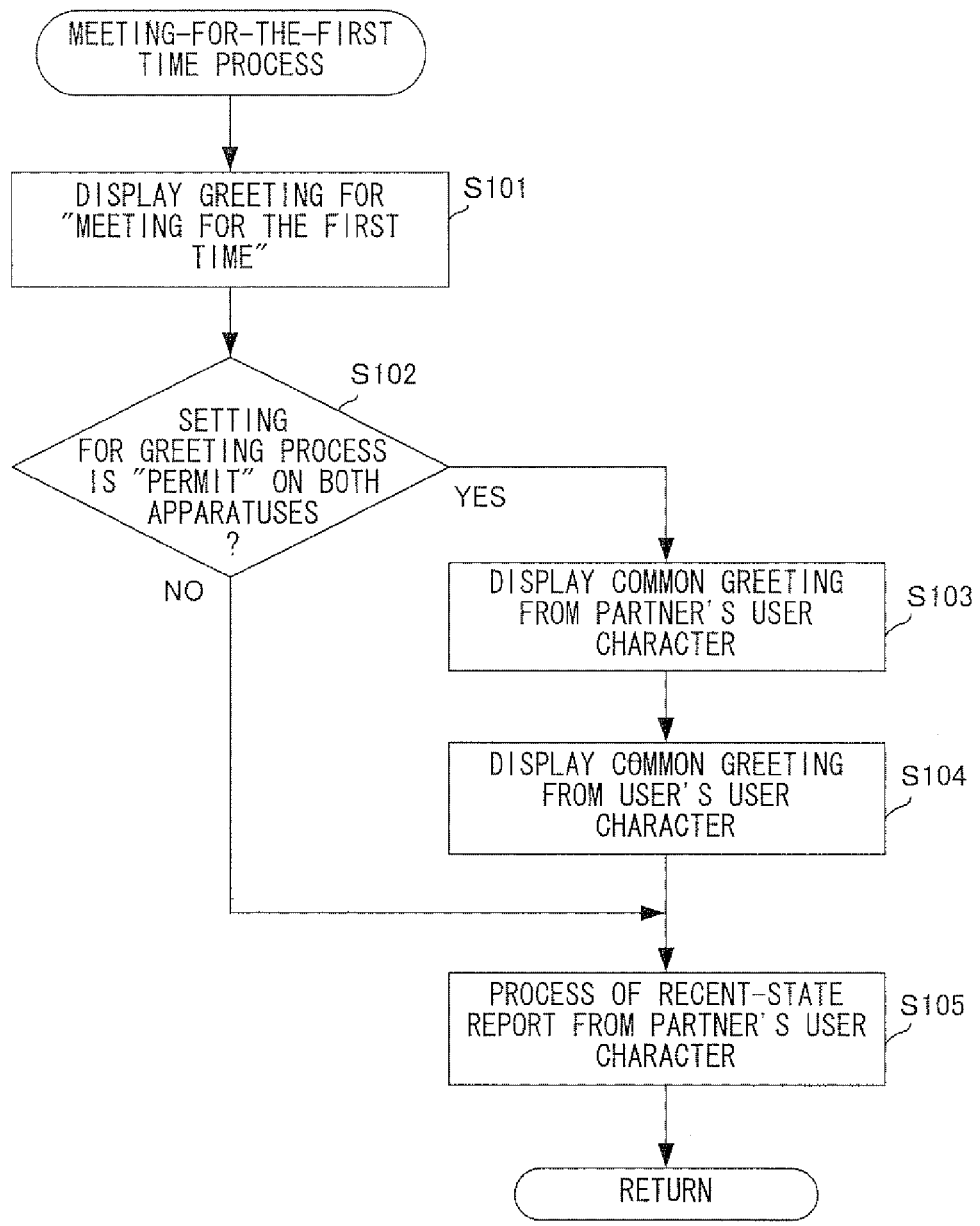
FIG. 35 is a flow chart showing in detail the plaza application main process.
Figure 36:
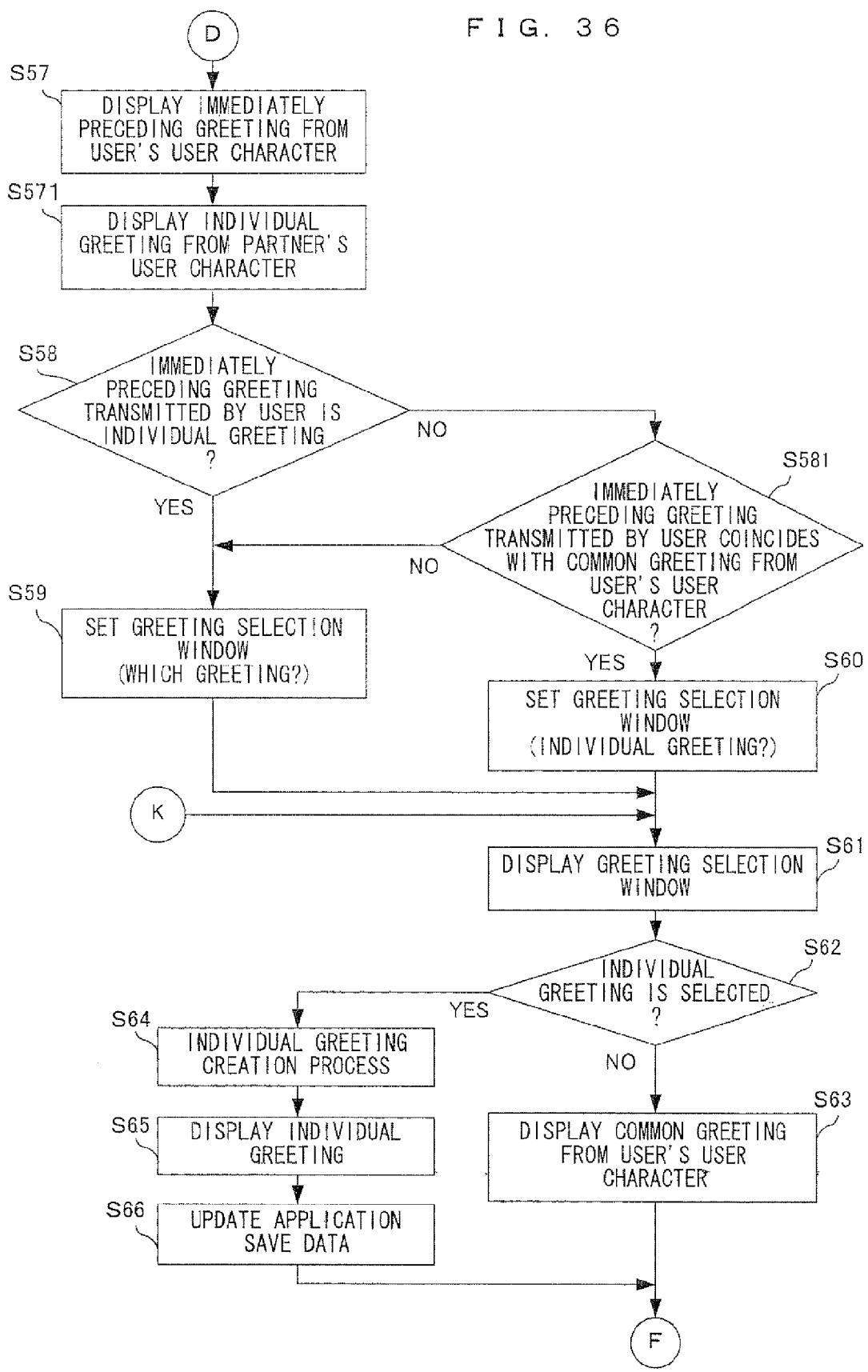
FIG. 36 is a flow chart showing in detail the plaza application main process.

As a result of the determination, in a case where the user character is "met for the first time" (YES in step S48), a meeting-for-the-first time process is performed in step S49. FIG. 35 is a flow chart showing in detail the meeting-for-the-first time process. First, in step S101, a greeting for "meeting for the first time" is displayed. The greeting for "meeting for the first time" is a character string defined in advance. Here, a greeting "How do you do?" as shown in FIG. 8 is displayed.

Next, in step S102, it is determined whether performing the greeting process is permitted on each game apparatus. For example, first, the greeting process execution flag 374 in the application save data 363 is referred to, and it is determined whether performance of the greeting process is permitted on the own game apparatus. As a result, if the performance of the greeting process is not permitted, the determination result in step S102 is NO. If the performance of the greeting process is permitted, then, the greeting process execution flag 345R of the process target character is referred to, and it is determined whether performance of the greeting process is permitted on the partner's game apparatus. Here, in a case where the permission has not been given, the determination result in step S102 is NO. In a case where the permission has been given, the determination result in step S102 is YES.

As a result of the determination in step S102, if the performance of the greeting process is not permitted on at least one game apparatus (NO in step S102), the processing is advanced to step S105 described below. On the other hand, if the performance of the greeting process is permitted on both game apparatuses (YES in step S102), then, in step S103, the common greeting character string data 342R in the reception data 335 is referred to, and the "common greeting" concerning the process target character (that is, "common greeting" from the partner's user character) is displayed.

Next, in step S104, the common greeting character string data 372 in the application save data 363 is referred to, and the "common greeting" created by the user himself/herself (that is, "common greeting" from the user's user character) is displayed. In other words, in the case of "meeting for the first time", no "individual greeting" is used.

Next, in step S105, a process of the recent-state report concerning the process target character is performed. This process is a process in which the profile data 343R in the reception data 335 is referred to and a message reflecting the content thereof is created and displayed. Then, the meeting-for-the-first time process ends.

With reference back to FIG. 34, after the meeting-for-the-first time process ends, the processing is advanced to step S78 described below, and a process concerning the next other user character is started (that is, in the case of "meeting for the first time", the evaluation process is not performed).

On the other hand, in a case where it has been determined that the user character is not a user character "met for the first time as a result of the determination in step S48 in FIG. 34 (NO in step S48), a process of displaying the number of times of encountering the process target character (the number of times of passing communications that have been performed) is performed in step S50. Specifically, the received user character information storage data 364 is referred to, and the number of times of passing 394 concerning the process target character is obtained. Then, based on a value obtained by adding 1 to the number of times of passing 394, a screen as shown in FIG. 9 is created to be displayed. This value obtained after the addition is stored as the number of times of passing 394 concerning the process target character.

Next, in step S51, whether to perform greeting process is determined. That is, it is determined whether performance of the "greeting process" is permitted on both game apparatuses. As a result of the determination, if the performance of the greeting process is not permitted on at least one game apparatus (NO in step S51), the processing is advanced to step S67 described below. On the other hand, if the performance of the greeting process is permitted on both game apparatuses (YES in step S51), it is determined, in step S52, whether the type of greeting from the process target character (partner's user character) is the "common greeting". Specifically, first, the individual greeting data 347R in the reception data 335 concerning the process target character is referred to, and a destination user character ID 348R that coincides with the user character ID 322 of the user's user character is searched for. As a result, if the destination user character ID 348R is found, it is determined that the greeting from the partner's user character is the "individual greeting", and if the destination user character ID 348R is not found, it is determined that the greeting from the partner's user character is the "common greeting".

As a result of the determination in step S52, if the greeting from the process target character is the "common greeting" (YES in step S52), then, in step S53, based on the common greeting character string data 342R in the reception data 335 concerning the process target character, the "common greeting" of the process target character is displayed.

Next, in step S54, it is determined whether the number of times of passing performed with respect to the process target character is two. For example, the received user character information storage data 364 is referred to, and it is determined whether there is data of a reception user character corresponding to the process target character. If such data is present, the number of times of passing 394 is referred to, and in a case where data indicating "two" is stored, it is determined the second passing has been performed this time. As a result of the determination, if the number of times of passing is two (YES in step S54), a message to the effect that transmission of the "individual greeting" can be performed is displayed in step S55. Next, in step S56, contents to be displayed in the greeting selection window 105 as shown in FIG. 14 are set. Here, two options of "for all" and "individual" as shown in FIG. 14 are set. Thereafter, the processing is advanced to step S61 described below.

Meanwhile, as a result of the determination in step S54, if the number of times of passing is not two (that is, three or more) (NO in step S54), the process in step S55 is skipped.

Next, a process to be performed in a case where, as a result of the determination in step S52, the greeting from the process target character is not the "common greeting" (NO in step S52), in other words, the greeting from the process target character is the "individual greeting", will be described. In this case, performed is a process for displaying a screen for showing the "individual greeting" from the partner's user character, and the character string of the greeting from the user's user character, based on which the "individual greeting" from the partner's user character has been made. First, in step S57 in FIG. 36, the individual greeting data 347R of the process target character is referred to, and cited greeting character string data 350R is obtained. Then, the character string indicated by the data, that is, the content of the greeting that the user made in the immediately preceding passing, is displayed. Subsequently, in step S571, similarly, the individual greeting data 347R of the process target character is referred to, and individual greeting character string data 349R addressed to the user's user character is obtained. Then, based on the data, the "individual greeting" from the partner's user character is displayed. Therefore, first, the greeting that the user performed in the immediately preceding passing is displayed, and then, as if in response to this, the "individual greeting" from the partner's user character is displayed. In this manner, by displaying the greeting from the user's user character and the greeting from the partner's user character in this order, the user's user character 101 and the partner's user character 102 are displayed as if they are talking with each other.

Next, in step S58, a cited greeting type flag 351R of the reception data 335 concerning the process target data is referred to, and it is determined whether the type of greeting that the user sent in the immediately preceding passing communication with the process target character was the "individual greeting". As a result, if the greeting sent in the immediately preceding passing communication was the "individual greeting" (YES in step S58), the content of the greeting selection window 105 is set in step S59. The content to be set here is the content of the greeting selection window 105 as shown in FIG. 14.

Meanwhile, if the greeting sent in the immediately preceding passing communication is the "common greeting" (NO in step S58), then, in step S581, the cited greeting character string data 350R and the common greeting character string data 372 are referred to, and it is determined whether the contents coincide with each other. As a result, if the contents do not coincide with each other (NO in step S581), the processing is advanced to step S59. On the other hand, if the contents coincide with each other (YES in step S581), a content of the greeting selection window 105 is set in step S60. However, the content to be set here is the content of asking the user whether to perform the "individual greeting", as shown in FIG. 39. This is for preventing the user from performing an identical greeting a plurality of times in the form of the "common greeting", and for prompting the user to return an "individual greeting" to an "individual greeting" from the partner's user character which was made in response to the "common greeting". Step S581 is provided on an assumption that, after the immediately preceding passing communication was performed, the user has changed the character string of the "common greeting" and has performed the passing communication with the same partner. That is, in a case where the user has changed, after sending a "common greeting" to a partner, the character string of the "common greeting" and sends the new "common greeting" to the same partner, the "common greeting" having an identical character string is not performed in succession because the content of the greeting has been changed to a different character string. Therefore, in order to determine whether such change of the "common greeting" has been performed, the determination in step S581 is performed.

With reference back to FIG. 36, in step S61, the greeting selection window 105 having the content set in step S59 or step S60 is created and displayed. Then, an input from the user with respect to the selection box is accepted.

Next, in step S62, it is determined whether the content selected by the user with respect to the greeting selection window 105 is the "individual greeting". As a result of the determination, if the "individual greeting" has not been selected (NO in step S62), the "common greeting" based on the common greeting character string data 372 is displayed in step S63. Then, the processing is advanced to step S67 described below.

Meanwhile, if the "individual greeting" has been selected (YES in step S62), a process for creating an "individual greeting" is performed in step S64. Specifically, a character string input screen is displayed, and a character string input by the user is accepted. When the character string input by the user is finished, a confirmation message is displayed (see FIG. 16). When the input content is fixed, then, in the step S65, based on the inputted character string data, the "individual greeting" that the user has inputted is displayed as shown in FIG. 17. Next, in step S66, the individual greeting data 376 in the application save data 363 is updated. Specifically, the user character ID 322R indicating the current process target character is stored as the destination user character ID contained in the individual greeting data 376 in the application save data 363. Moreover, the data of the fixed character string of the input is stored as the individual greeting character string data, the character string data of the greeting from the current process target character is stored as the cited greeting character string data, and the data indicating the type of greeting from the current process target character is stored as the cited greeting type flag. Then, the greeting process ends.

Figure 37:
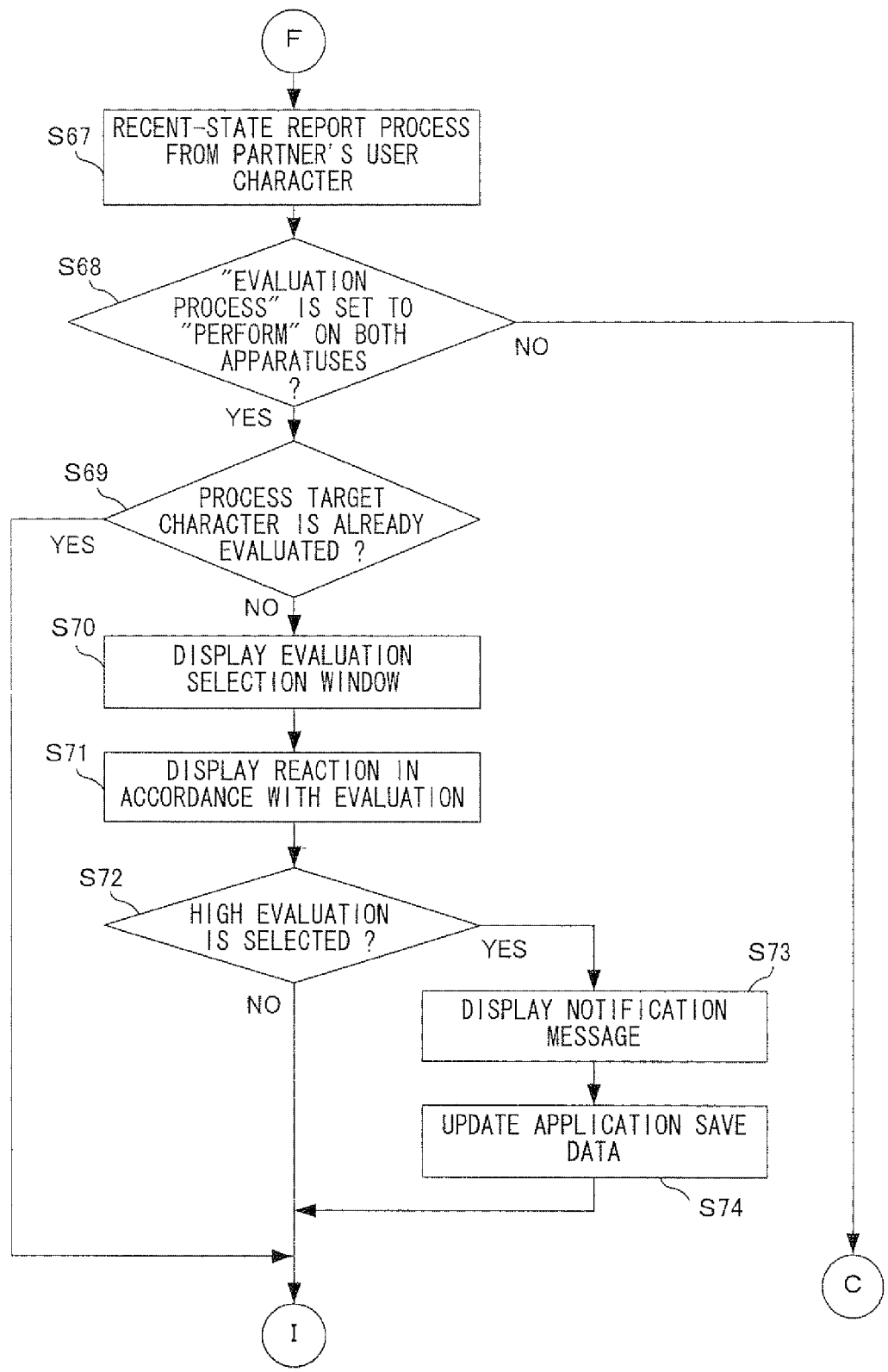
FIG. 37 is a flow chart showing in detail the plaza application main process.

Next, in step S67 in FIG. 37, a recent-state report process of the partner's user character is performed. After the recent-state report process of the partner's user character is finished, the evaluation process is performed. First, in step S68, it is determined whether performance of the evaluation process is permitted on both of the user's game apparatus and the partner's game apparatus. This is determined by the evaluation process execution flags set on the partner's game apparatus and the user's game apparatus being referred to. As a result of the determination, if the performance of the evaluation process is not permitted on at least one game apparatus (NO in step S68), the processing is advanced to step S78 described below.

On the other hand, if the performance of the evaluation process is permitted on both game apparatuses (YES in step S68), it is determined, in step S69, whether the process target character has already been evaluated. In this step, first, it is determined whether the number of times of passing performed with respect to the process target character is two. If the number is two, it is determined that no evaluation has been performed yet. On the other hand, if the number is three or more, the user character data 392 of the process target character stored in the received user character information storage data 364 is compared with the transmission user character data 341R in the reception data 335, and whether the appearances of the user characters coincide with each other is determined. As a result, if there is a difference between the appearances, it is considered that evaluation with respect to the new appearance has not been performed yet, and it is determined that evaluation has not been performed yet. In the case where the number is three or more, and if there is no difference between the current appearance and the immediately preceding appearance, it is determined that evaluation has been performed. It should be noted that, even in a case where, for example, the evaluation process execution flag 346R of the partner's game apparatus was set at "not permit" in the second passing, and the evaluation process execution flag 346R of the partner's game apparatus is set at "permit" in the third passing, if the appearance of the process target characters is not changed between the second and the third passing, it is determined that evaluation has been performed.

As a result of the determination in step S69, if it is determined that evaluation has already been performed (YES in step S69), the processing is advanced to step S75 described below. On the other hand, if evaluation has not been performed (NO in step S69), a screen as shown in FIG. 18 is displayed in step S70. That is, the evaluation selection window 107 having two options (high evaluation/ordinary) is displayed to accept an input by the user.

Next in step S71, a reaction by the process target character in response to the content of the input by the user is displayed (see FIG. 19). Moreover, the content of the user character data 392 of the process target character stored in the received user character information storage data 364 is updated as appropriate based on the content of the received data.

Next, in step S72, it is determined whether the content of the input by the user is a content of the high evaluation. As a result, if in the case of the high evaluation (YES in step S72), a notification message is displayed in step S73 to the effect that the evaluation will be transmitted to the game apparatus 1 which is the transmission source of the process target character next time the user passes by the partner. Next, in step S74, among the pieces of the application save data 363, data concerning the evaluation process is updated as appropriate. Specifically, the user character ID of the process target character is stored in the evaluation list 377 in the application save data 363. At this time, if an identical ID is present, the older one is deleted. If 32 IDs are already registered, the data of the oldest ID is deleted and then the current ID is stored.

On the other hand, if the content of the evaluation is not the high evaluation (NO in step S72) as a result of the determination in step S72, the processes in step S73 and step S74 are skipped.

Next, in step S75 in FIG. 38, it is determined whether there is evaluation data from the partner's user character to the user's user character. Specifically, the received-evaluation data 378 in the application save data 363 is referred to first, and then, it is determined whether 100 evaluations have already been received (whether 100 evaluations have been registered). As a result, if the number of the evaluations is less than 100, an evaluation list 352R of the reception data 335 concerning the process target character is searched for the user character ID of the user's user character (the user character currently set for the passing communication). As a result, if the user character ID is found, it is determined that there is evaluation data to the user's user character, and if the user character ID is not found, it is determined that there is no evaluation data to the user's user character. Meanwhile, if 100 evaluations have already been stored in the received-evaluation data 378, even when there is evaluation data from the partner's user character to the user's user character, it is determined that there is no evaluation data. That is, in a case where there are already 100 evaluations, the process concerning the evaluation from the partner's user character is not performed.

As a result of the determination in step S75, if there is no evaluation data from the partner's user character to the user's user character (NO in step S75), the processing is advanced to step S78 described below. On the other hand, when there is evaluation data to the user's user character (YES in step S75), it is determined, in step S751, whether the combination of a user character ID 353R in the evaluation list 352R in the reception data 335 (corresponds to the evaluation target user character ID 380) and a creator ID 325R in the transmission user character data 341R in the reception data 335 (corresponds to the evaluating-creator information 381) is present in the received-evaluation data 378. As a result, if the combination is present (YES in step S751), it means that an evaluation has been received from the partner's user character. Therefore, the processing is advanced to the step S78 described below. On the other hand, the combination is not present (NO in step S751), it means that an evaluation has not been received from the partner's user character. In this case, a process of displaying an evaluation from the partner's user character is performed in step S76. That is, a screen as shown in FIG. 20 is displayed.

Next, in step S77, the accumulating total number of high evaluations is displayed. Specifically, the user character ID 322 of the user's user character that has been evaluated this time is stored as the evaluation target user character ID 380 of the evaluator information 379, and a creator information ID 325R of the current process target character is stored as the evaluating-creator information 381. Then, the number of pieces of the evaluator information 379 contained the received-evaluation data 378 is calculated as the accumulating total number of high evaluations. In other words, in a case where a plurality of user characters have been created, the accumulating total number is a value obtained by totaling the number of high evaluations given to all of the user characters. Each user character can obtain an evaluation from each partner. Thus, in a case, for example, where a user character A has obtained high evaluations from two other users, and a user character B has obtained high evaluations from four other users, the accumulating total number of high evaluations is six. This is intended to allow the user to have an object of collecting many high evaluations, thereby allowing the user to create a variety of user characters and enjoy the game more. Then, based on the accumulating total number, a screen as shown in FIG. 21 is generated and displayed.

It should be noted that, as a result of the determination in step S751, if the above combination is already present, the processing may be advanced to step S76. In this case, the accumulating total number of high evaluations may not be updated. That is, with respect to the partner from whom an evaluation has been received, only the evaluation from the partner is displayed and the accumulating total number addition may not be performed.

Then, the evaluation process ends. The reception data 335 concerning the user character with which the greeting process and the evaluation process have been finished is cleared from the passing reception data 334 since the processes have been performed.

Next, in step S78, it is determined whether there are other pieces of reception data 335 with which the above described processes have not been performed. As a result, if there are other pieces of reception data 335 with which the above described processes have not been performed (YES in step S78), the processing returns to step S46, and the processing is repeated. On the other hand, all of the pieces of reception data 335 have been processed (NO in step S78), the passing transmission data 333 is updated as appropriate such that the above described process contents are reflected in step S79. That is, individual greeting data 347S, which is data related to the individual greeting in the greeting process, an evaluation list 352S concerning the evaluation process, and the like are updated as appropriate.

Next, in step S80, a plaza main screen is displayed, and then, in step S81, processes of other applications contained in the plaza application are performed. In step S82, it is determined whether an ending instruction of the plaza application is given by the user. If no ending instruction has been given (NO in step S82), the process in step S81 is repeated, and if the ending instruction has been given (YES in step S82), the plaza application ends, and the home menu screen is displayed. This is the end of description of the plaza application process according to the embodiment.

As described above, in the embodiment, it is configured that communications with an unspecified number of partners are first performed by use of the "common greeting" transmitted thereto. Then, with respect to a partner with whom the user has passed by a plurality of times, the user can transmit the "individual greeting" addressed to the specific partner. By this, it is possible to prevent the content of communication with other users from being uniform, and a feeling of closeness with the partner whom the user often passes by can be enhanced. Accordingly, fun of communication with others by means of the passing communication as described above can be enhanced. In other words, by the user repeating the passing communication, a person with whom the user may have a close relationship is extracted, and the user can approach the person individually. Accordingly, the possibility of the user's making friends with a new person can be enhanced.

Further, when the individual greeting from the partner's user character is displayed, the content of the greeting from the user's user character, based on which the individual greeting from the partner's user character has been made, is also displayed. Accordingly, it is easier for the user to understand to which greeting sent by the user the greeting from the partner's user character (content of the response from the partner's user character) has been made. In particular, since the greeting is transmitted/received through the passing communication as described above, in other words, since the content of the greeting is not transmitted/received in real time, display of the content of the greeting sent by before is effective.

Moreover, the user can transmit the users user character by means of the passing communication, which is a short-distance wireless communication, and have the user's user character evaluated by other users. That is, in the neighborhood of the region where the user lives, the user can have the user character that is created by himself/herself evaluated by others, and can have feedback of the evaluation. Accordingly, the user can enjoy, in a simple manner, having the user's user character evaluated by others. As a result, it is possible to activate communications with others without using a complicated system configuration.

Moreover, with respect to the evaluation, it is configured such that feedback is given to a user (partner) only when a high evaluation is given. Accordingly, it is possible to reduce the user's feeling dissatisfaction about the evaluation content, and thus, it is possible to prevent the fun of the game from being reduced. Further, in a case where a plurality of user characters are used, only one evaluation is allowed in principle for each user character. However, the number of high evaluations given to the respective characters are totaled and displayed. Accordingly, it is possible to encourage the user to create many user characters in order to obtain many high evaluations, and thus, it is possible to prompt the user to perform many passing communications.

In the embodiment, with respect to the content of the "greetings", an exemplary case has been described in which only character strings are used. However, images, sounds and the like, if only they allow the user to create free expression, may also be used. Further, the content of the "greetings" is not limited to what is created on the game apparatus 1. A content created on an external apparatus may be used. Moreover, for example, when the "greeting" is displayed, the user character may perform a predetermined action (emotional action and the like). In this case, data indicating the content of the predetermined action may be contained in the data of the "common greeting" or the "individual greeting".

In the embodiment, with respect to the timing at which an "individual greeting" is created, when the user selects creation of the "individual greeting" on the greeting selection window 105, an "individual greeting" input screen is displayed. Alternatively, the "individual greeting" may be created at other timings. For example, creation and storage of the "individual greeting" are allowed as a function of the main process of the plaza application. Then, the user uses the function, creates some "individual greetings," and causes the game apparatus 1 to store them. Then, the greeting process as described above is performed. When the user selects creation of the "individual greeting" in the greeting selection window 105, the input screen is not displayed, but options (list) of the "individual greetings" that the user created in advance by using the above function are displayed instead. Then, the user may select one of the "individual greetings".

In the embodiment, an exemplary case has been described in which the passing communication is performed in the "sleep mode". However, the passing communication may be performed in other states than the "sleep mode".

In the embodiment, an exemplary case has been described in which the game apparatuses 1 performing transmission/reception are both hand-held game apparatuses. However, either one of the game apparatuses may be a stationary game apparatus. For example, user characters may be transmitted/received through the passing communication between a stationary game apparatus placed near a window and the user's hand-held game apparatus of the user who passes nearby In the embodiment, with respect to the user characters, an exemplary case has been described in which a user character created by the user by means of the user character creation application is set as a user character for the passing communication. Alternatively, another user character obtained through the passing communication may be set as a character for the passing communication (that is, as a user character to be transmitted from the user).

In the embodiment, an exemplary case has been described in which an evaluation result based on evaluation data received from another game apparatus 1 is displayed on the screen. Alternatively, the user may be notified of the evaluation result by means of sound, vibration, and the like.

In the embodiment, an exemplary case has been described in which the series of processes concerning the greeting process and the evaluation process which use other user characters received through the passing communication is performed in a single apparatus (the game apparatus 1). However, in another embodiment, the series of processes may be performed in an information processing system which is constituted of a plurality of information processing apparatuses. For example, in an information processing system which includes a terminal side apparatus and a server side apparatus communicable with the terminal side apparatus via a network, a part of the series of processes may be performed in the server side apparatus. Alternatively, in an information processing system which includes a terminal side apparatus and a server side apparatus communicable with the terminal side apparatus via a network, a main process of the series of processes may be performed by the server side apparatus, and a part of the series of processes is performed in the terminal side apparatus. Still alternatively, in the information processing system, the server side system may be constituted of a plurality of information processing apparatuses, and a process to be performed in the server side system may be divided and performed by the plurality of information processing apparatuses.

While the invention has been described in detail, the foregoing description is in all aspects illustrative and not restrictive. It will be understood that numerous other modifications and variations can be devised without departing from the scope of the invention.

What is claimed is:

1. A communication system which includes a plurality of information processing apparatuses, each of the plurality of information processing apparatuses comprising:
    a memory for storing first data;
    wireless communication circuitry; and
    processing circuitry for
        controlling the wireless communication circuitry to repeatedly search for partner information processing apparatuses in a wireless communication range of the information processing apparatus,
        for each partner information processing apparatus found during the searching, controlling the wireless communication circuitry to automatically establish wireless communication therewith, controlling the wireless communication circuitry to automatically transmit transmission data including the first data thereto, controlling the wireless communication circuitry to automatically receive, as reception data, transmission data including first data transmitted therefrom, and controlling the wireless communication circuitry to automatically disconnect the wireless communication therewith when the transmitting of the transmission data and the receiving of the reception data are complete;
        setting, for each of one or more of the partner information processing apparatuses from which reception data is received, respective second data different from the first data and
        storing the respective second data in the memory, wherein
    the transmission data transmitted by the information processing apparatus to partner information processing apparatuses found during searching subsequent to the setting and storing of respective second data includes the respective set and stored second data.

2. The communication system according to claim 1, wherein the wireless communication circuitry of each of the plurality of information processing apparatuses is configured for short-distance wireless communication.

3. The communication system according to claim 1, wherein each of the plurality of information processing apparatuses is a portable information processing apparatus.

4. A non-transitory computer-readable storage medium having stored thereon an information processing program for execution by a computer of an information processing apparatus connected to wireless communication circuitry and to a memory storing first data, the information processing program, when executed, causing the computer to control the information processing apparatus to at least:
    repeatedly search, using the wireless communication circuitry, for partner information processing apparatuses in a wireless communication range of the information processing apparatus;
    for each partner information processing apparatus found during the searching, automatically establish, via the wireless communication circuitry, wireless communication therewith, automatically transmit, via the wireless communication circuitry, transmission data including the first data thereto, automatically receive, as reception data, via the wireless communication circuitry, transmission data including first data transmitted therefrom, and disconnect the wireless communication therewith when the transmitting of the transmission data and the receiving of the reception data are complete; and
    setting, for each of one or more of the partner information processing apparatuses from which reception data is received, respective second data different from the first data, and storing the respective second data, wherein
    the transmission data transmitted by the information processing apparatus to partner information processing apparatuses found during searching subsequent to the setting and storing of respective second data includes the respective set and stored second data.

5. The non-transitory computer-readable storage medium according to claim 4, wherein
    the first data is data for an unspecified partner information processing apparatus, and
    the second data is data for a specific partner information processing apparatus.

6. The non-transitory computer-readable storage medium according to claim 4, wherein
    the wireless communication circuitry is configured for short-distance wireless communication.

7. The non-transitory computer-readable storage medium according to claim 4, wherein
    the second data is user-created.

8. The non-transitory computer-readable storage medium according to claim 4, wherein the information processing program, when executed, causes the computer to further control the information processing apparatus to
    display content based on the first data in the reception data, and
    after the content is displayed, receive user-supplied inputs for creating the second data.

9. The non-transitory computer-readable storage medium according to claim 8, wherein
    the first data and the second data are character string data, and
    citation data is included in the second data, the citation data indicating content of the first data or content of the second data and being displayed when the second data is created.

10. The non-transitory computer-readable storage medium according to claim 8, wherein
the first data is created in advance before an initial communication with a partner information processing apparatus, and
the second data for a particular partner information processing apparatus is created only after first data received from that partner information processing apparatus is displayed.

11. The non-transitory computer-readable storage medium according to claim 4, wherein
the transmission data comprises image data for a character and the first data, and the reception data comprises image data of a character and first data, and
the second data is transmitted to respective partner information processing apparatuses with which transmission/reception of the image data of the character and the first data has been performed previously.

12. The non-transitory computer-readable storage medium according to claim 7, wherein
the second data comprises user-supplied text.

13. The non-transitory computer-readable storage medium according to claim 4, wherein
the information processing apparatus is a hand-held information processing apparatus.

14. An information processing method for transmitting data, the information processing method comprising:
repeatedly searching, using wireless communication circuitry, for partner information processing apparatuses in a wireless communication range of the information processing apparatus;
for each partner information processing apparatus found during the searching, automatically establishing, via the wireless communication circuitry, wireless communication therewith, automatically transmitting, via the wireless communication circuitry, transmission data including first data thereto, automatically receiving, as reception data, via the wireless communication circuitry, transmission data including first data transmitted therefrom, and disconnecting the wireless communication therewith when the transmitting of the transmission data and the receiving of the reception data are complete; and
setting, for each of one or more of the partner information processing apparatuses from which reception data is received, respective second data different from the first data, and storing the respective second data, wherein
the transmission data transmitted to partner information processing apparatuses found during searching subsequent to the setting and storing of respective second data includes the respective set and stored second data.

15. An information processing apparatus connected to a memory storing first data, the information processing apparatus comprising:
wireless communication circuitry; and
processing circuitry for
controlling the wireless communication circuitry to repeatedly search for partner information processing apparatuses in a wireless communication range of the information processing apparatus;
for each partner information processing apparatus found during the searching, controlling the wireless communication circuitry to automatically establish communication therewith, controlling the wireless communication circuitry to automatically transmit transmission data including the first data thereto, controlling the wireless communication circuitry to automatically receive, as reception data, transmission data including first data transmitted therefrom, controlling the wireless communication circuitry to automatically disconnect the wireless communication therewith when the transmitting of the transmission data and the receiving of the reception data are complete, setting, for each of one or more of the partner information processing apparatuses from which reception data is received, respective second data, different from the first data, and storing the respective second data in the memory, wherein
the transmission data transmitted by the information processing apparatus to partner information processing apparatuses found during searching subsequent to the setting and storing of respective second data includes the respective set and stored second data.

16. An information processing system connected to a memory storing first data, the information processing system comprising:
wireless communication circuitry; and
processing circuitry for
controlling the wireless communication circuitry to repeatedly search for partner information processing apparatuses in a wireless communication range of the information processing apparatus;
for each partner information processing apparatus found during the searching, controlling the wireless communication circuitry to automatically establish communication therewith, controlling the wireless communication circuitry to automatically transmit transmission data including the first data thereto, controlling the wireless communication circuitry to automatically receive, as reception data, transmission data including first data transmitted therefrom, controlling the wireless communication circuitry to automatically disconnect the wireless communication therewith when the transmitting of the transmission data and the receiving of the reception data are complete, setting, for each of one or more of the partner information processing apparatuses from which reception data is received, respective second data, different from the first data, and storing the respective second data in the memory, wherein
the transmission data transmitted to partner information processing apparatuses found during searching subsequent to the setting and storing of respective second data includes the respective set and stored second data.

17. A portable information processing apparatus comprising:
a display;
wireless communication circuitry;
memory; and
processing circuitry, wherein
the processing circuitry is configured to execute an application program stored in the memory and to control the wireless communication circuitry to search for partner portable information processing apparatuses,
the wireless communication circuitry, under control of the processing circuitry, is configured to transmit transmission data to each of a plurality of partner portable information processing apparatuses found during searching and to receive, as reception data, transmission data transmitted from each of the plurality of partner portable information processing apparatuses found during the searching, the transmission data transmitted by the portable information processing apparatus includes (i) common message data for use by the application program when the application program is executed by partner portable information processing apparatuses with which the portable information processing apparatus has not previously communicated, and (ii) respective individualized message data for use by the application program when the application program is executed by each of one or more partner portable information processing apparatuses with which the portable information processing apparatus has previously communicated, and the application program sets the individualized message data for a particular partner information processing apparatus only after the portable information processing apparatus receives reception data from that particular partner information processing apparatus.

18. A communication system which includes a plurality of information processing apparatuses, each of the plurality of information processing apparatuses comprising:
   a memory for storing character data for a character and first data;
   wireless communication circuitry; and
   processing circuitry for
      controlling the wireless communication circuitry to repeatedly search for partner information processing apparatuses in a wireless communication range of the information processing apparatus;
      for each partner information processing apparatus found during the searching, controlling the wireless communication circuitry to automatically establish communication therewith, controlling the wireless communication circuitry to automatically transmit transmission data including the character data and the first data thereto, controlling the wireless communication circuitry to automatically receive, as reception data, transmission information including character data and first data transmitted therefrom, and controlling the wireless communication circuitry to automatically disconnect the wireless communication therewith when the transmitting of the transmission data and the receiving of the reception data are complete;
      setting, for each of one or more partner information processing apparatus from which reception data is received, respective second data different from the first data; and
      storing the respective second data in the memory, wherein
      the transmission data transmitted to partner information processing apparatuses found during searching subsequent to the setting and storing of respective second data includes the respective set and stored second data.

* * * * *